United States Patent
AbuKhalaf et al.

(10) Patent No.: US 12,113,375 B2
(45) Date of Patent: *Oct. 8, 2024

(54) WIRELESS POWER MODE SWITCHING

(71) Applicant: Apple Inc., Cupertino, CA (US)

(72) Inventors: Zaid A. AbuKhalaf, Sunnyvale, CA (US); Alexei E. Kosut, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,107

(22) Filed: Sep. 8, 2023

(65) Prior Publication Data
US 2023/0421000 A1    Dec. 28, 2023

Related U.S. Application Data

(63) Continuation of application No. 17/100,317, filed on Nov. 20, 2020, now Pat. No. 11,843,265.
(Continued)

(51) Int. Cl.
*H02J 50/80*    (2016.01)
*H02J 7/00*    (2006.01)
(Continued)

(52) U.S. Cl.
CPC .......... *H02J 50/80* (2016.02); *H02J 7/0048* (2020.01); *H02J 7/007182* (2020.01); *H02J 50/10* (2016.02); *H02J 50/40* (2016.02)

(58) Field of Classification Search
CPC ...................................................... H02J 50/80
(Continued)

(56) References Cited

U.S. PATENT DOCUMENTS 7,208,919 B2   4/2007   May
9,479,012 B2  10/2016   Nahidipour
(Continued)

FOREIGN PATENT DOCUMENTS

KR    20140113892 A    9/2014
KR    20160077695 A    7/2016
(Continued)

OTHER PUBLICATIONS

Mjay Muni et al., IoT Based Smart Battery Station Using Wireless Power Transfer Technology, International Journal of Scientific and Technology Research, Jan. 2020, pp. 2876-2881, vol. 9, No. 1.

*Primary Examiner* — Edward Tso
*Assistant Examiner* — Ahmed H Omar
(74) *Attorney, Agent, or Firm* — Treyz Law Group, P.C.; Joseph F. Guihan

(57) ABSTRACT

A wireless power system may include power transmitting devices, power receiving devices, and power transmitting and receiving devices. Control circuitry in the power transmitting and receiving device may determine whether to operate in a power receiving mode or a power transmitting mode. The preferred mode for the power transmitting and receiving device may depend on the types of devices within the system, the state of charge of the batteries of the devices in the system, whether or not one or more devices in the system are connected to a wired power source, etc. Each power transmitting and receiving device may have a default mode. Upon detection of an adjacent device, the wireless power transmitting and receiving device enters a configuration phase in its default mode. Before or during a power transfer phase, the power transmitting and receiving device may swap roles from its default mode to another mode.

20 Claims, 11 Drawing Sheets

Related U.S. Application Data

(60) Provisional application No. 63/047,797, filed on Jul. 2, 2020, provisional application No. 63/047,779, filed on Jul. 2, 2020.

(51) Int. Cl.
*H02J 50/10* (2016.01)
*H02J 50/40* (2016.01)

(58) Field of Classification Search
USPC .......................................................... 320/108
See application file for complete search history.

(56) References Cited

U.S. PATENT DOCUMENTS

| | | |
|---|---|---|
| 9,762,082 B2 | 9/2017 | Park |
| 9,837,203 B2 | 12/2017 | Singh |
| 9,991,747 B2 | 6/2018 | Toncich et al. |
| 10,090,886 B1 | 10/2018 | Bell et al. |
| 10,199,877 B2 * | 2/2019 | Van Den Brink ..... H04B 5/266 |
| 10,361,580 B2 | 7/2019 | Cha |
| 10,446,317 B2 | 10/2019 | Hall et al. |
| 10,454,318 B2 | 10/2019 | Lee et al. |
| 10,461,583 B2 | 10/2019 | Yeo et al. |
| 10,615,646 B2 | 4/2020 | Staring et al. |
| 2009/0212637 A1 | 8/2009 | Baarman et al. |
| 2013/0026981 A1 | 1/2013 | Van Der Lee |
| 2013/0043738 A1 | 2/2013 | Park et al. |
| 2014/0070624 A1 | 3/2014 | Kim et al. |
| 2015/0364946 A1 | 12/2015 | Wang et al. |
| 2016/0190861 A1 | 6/2016 | Cha |
| 2016/0197490 A1* | 7/2016 | Hirose .................... H02J 50/10 307/104 |
| 2017/0025874 A1 | 1/2017 | Lei et al. |
| 2018/0244167 A1 | 8/2018 | Penilla et al. |
| 2019/0025891 A1 | 1/2019 | Kim et al. |
| 2019/0058360 A1 | 2/2019 | Garbus et al. |
| 2019/0097447 A1 | 3/2019 | Partovi |
| 2019/0305595 A1 | 10/2019 | Mantha et al. |
| 2019/0305827 A1 | 10/2019 | Walley et al. |
| 2020/0028376 A1 | 1/2020 | Ha et al. |
| 2020/0067340 A1 | 2/2020 | Batra et al. |
| 2020/0119580 A1 | 4/2020 | Park et al. |
| 2020/0119581 A1 | 4/2020 | Kim et al. |
| 2020/0144837 A1 | 5/2020 | To et al. |
| 2020/0220367 A1 | 7/2020 | Cho et al. |
| 2020/0266650 A1 | 8/2020 | Cho et al. |
| 2020/0266674 A1* | 8/2020 | Lee ........................ H02J 7/342 |
| 2020/0358314 A1 | 11/2020 | Boovaragavan et al. |
| 2022/0368171 A1 | 11/2022 | Swaans et al. |

FOREIGN PATENT DOCUMENTS

| | | |
|---|---|---|
| KR | 20200042268 A | 4/2020 |
| WO | 2014027710 A1 | 2/2014 |

* cited by examiner

106/108

| | $b_7$ | $b_6$ | $b_5$ | $b_4$ | $b_3$ | $b_2$ | $b_1$ | $b_0$ |
|---|---|---|---|---|---|---|---|---|
| $B_0$ | SWAP | TETHERED | RESERVED | | | | | |
| $B_1$ | RESERVED | BATTERY LEVEL | | | | | | |

| | $b_7$ | $b_6$ | $b_5$ | $b_4$ | $b_3$ | $b_2$ | $b_1$ | $b_0$ |
|---|---|---|---|---|---|---|---|---|
| $B_0$ | SWAP REASON | | | | | | | |

*FIG. 7*

WIRELESS POWER MODE SWITCHING

This application is a continuation of U.S. patent application Ser. No. 17/100,317, filed Nov. 20, 2020, which claims the benefit of provisional patent application No. 63/047,797, filed Jul. 2, 2020, and provisional patent application No. 63/047,779, filed Jul. 2, 2020, which are hereby incorporated by reference herein in their entireties.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The wireless power receiving device has a coil and rectifier circuitry. The coil receives alternating-current wireless power signals from the wireless charging mat. The rectifier circuitry converts the received signals into direct-current power.

SUMMARY

A wireless power system may include one or more wireless power transmitting devices, one or more wireless power receiving devices, and one or more wireless power transmitting and receiving devices. The wireless power transmitting device may include a coil and wireless power transmitting circuitry coupled to the coil. The wireless power transmitting circuitry may be configured to transmit wireless power signals with the coil. The wireless power receiving device may include a coil that is configured to receive wireless power signals from the wireless power transmitting device and rectifier circuitry that is configured to convert the wireless power signals to direct current power. The wireless power transmitting and receiving device may include at least one coil and both wireless power transmitting circuitry and wireless power receiving circuitry.

Control circuitry in the wireless power transmitting and receiving device may determine whether to operate in a power receiving mode or a power transmitting mode. The preferred mode for the power transmitting and receiving device may depend on the types of devices within the wireless charging system, the state of charge of the batteries of the devices in the wireless charging system, whether or not one or more devices in the system are connected to a wired power source, etc.

Each wireless power transmitting and receiving device may have a default mode (e.g., either the power transmitting mode or power receiving mode). Upon detection of an adjacent device, the wireless power transmitting and receiving device enters a configuration phase in its default mode. A cellular telephone may use the power receiving mode as its default mode, whereas a battery case may use the power transmitting mode as its default mode.

Before or during a power transfer phase, the power transmitting and receiving device may swap roles from its default mode to another mode (e.g., from a power transmitting mode to a power receiving mode or vice versa). Either device may request the role swap. In some cases, a power transmitting and receiving device may switch roles after a given period of time elapses without linking to an additional device after detecting the presence of the additional device (e.g., a timeout).

BRIEF DESCRIPTION OF THE DRAWINGS

FIG. 6 is a diagram of an illustrative packet that may be used to send role swap capability information and other charging information from a device in a power receiving mode or a power transmitting mode in accordance with an embodiment.

FIG. 7 is a diagram of an illustrative packet that may be used to send a role swap request from a device in a power receiving mode or a power transmitting mode in accordance with an embodiment.

DETAILED DESCRIPTION

A wireless power system may include one or more electronic devices that transmit wireless power, one or more electronic devices that receive wireless power, and one or more electronic devices that both transmit and receive wireless power. The wireless power transmitting device may be a wireless charging mat or wireless charging puck, as examples. The wireless power receiving device may be a device such as a wrist watch, cellular telephone, tablet computer, laptop computer, or other electronic equipment, as examples. The wireless power transmitting and receiving device may be an electronic device case (e.g., a case for a cellular telephone) or other type of electronic device. The wireless power transmitting device may wirelessly transmit power to a wireless power receiving device. The wireless power receiving device uses power from the wireless power transmitting device for powering the device and for charging an internal battery.

Wireless power is transmitted from the wireless power transmitting device to the wireless power receiving device using one or more wireless power transmitting coils. The wireless power receiving device has one or more wireless power receiving coils coupled to rectifier circuitry that converts received wireless power signals into direct-current power.

Figure 1:
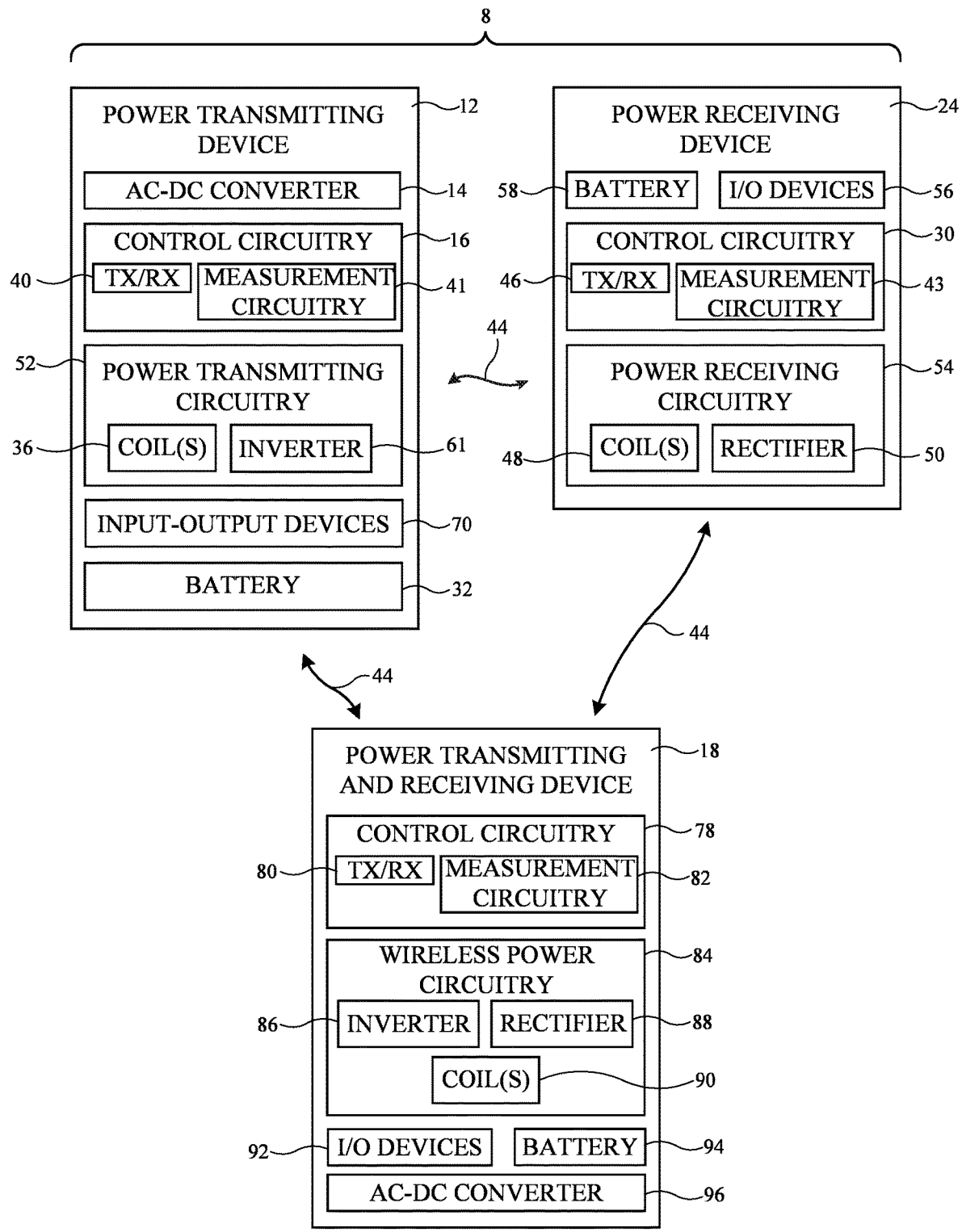
FIG. 1 is a schematic diagram of an illustrative wireless power system in accordance with an embodiment.

An illustrative wireless power system (wireless charging system) is shown in FIG. 1. As shown in FIG. 1, wireless power system 8 may include one or more wireless power transmitting devices such as wireless power transmitting device 12, one or more wireless power receiving devices such as wireless power receiving device 24, and one or more electronic devices capable of both transmitting and receiving wireless power such as wireless power transmitting and receiving device 18. It should be understood that one or more of each type of device may be present in the wireless power system at any given time, with devices being added and removed from the system in a fluid manner. Additionally, one or more devices may switch between tethered (where the device receives power from a wall outlet or other power source) and untethered (where the device battery is used to power the device) states. The function of power transmitting and receiving device 18 may change depending upon the arrangement of the system at a given time. A power transmitting and receiving device may only transmit power in some scenarios, may only receive power in some scenarios, and may both transmit and receive power in some scenarios. A power transmitting device 12 may transmit power directly to a power receiving device 24 in some scenarios. In other scenarios, power transmitting device 12 may transmit power to a power transmitting and receiving device 18, which then transmits the power to power receiving device 24. The functionality of each device and inductive coupling between each device within the system may be updated as devices are added to and removed from the system.

Wireless power transmitting device 12 includes control circuitry 16. Wireless power receiving device 24 includes control circuitry 30. Control circuitry 30 includes measurement circuitry 43 and wireless transceiver circuitry 46. Wireless power transmitting and receiving device 18 includes control circuitry 78. Control circuitry in system 8 such as control circuitry 16, control circuitry 30, and control circuitry 78 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12, 18, and 24. For example, the processing circuitry may be used in selecting coils, determining power transmission levels, processing sensor data and other data to detect foreign objects and perform other tasks, processing user input, handling negotiations between devices 12, 18, and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 16, 30, and/or 78. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16, 30, and/or 78. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat or puck are sometimes described herein as an example.

Power receiving device 24 may be a portable electronic device such as a wrist watch, a cellular telephone, a laptop computer, a tablet computer, an accessory such as an earbud, or other electronic equipment. Power transmitting device 12 may be coupled to a wall outlet (e.g., an alternating current power source), may have a battery 32 for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. For simplicity, an example is described herein of power transmitting device 12 transmitting wireless power to power receiving device 24. However, it should be understood that a power transmitting and receiving device 18 may substitute for one or both of the power transmitting device and the power receiving device during wireless power transfer operations.

Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Coils 36 may be arranged in a planar coil array or may be arranged to form a cluster of coils. In some arrangements, device 12 (e.g., a charging mat, puck, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. In other words, one or more of coils 36 is inductively coupled to one or more of coils 48. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-250 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display (screen) for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may optionally have one or more input-output devices 70 (e.g., input devices and/or output devices of the type described in connection with input-output devices 56). Device 18 may optionally have one or more input-output devices 92 (e.g., input devices and/or output devices of the type described in connection with input-output devices 56).

Device 12, device 18, and/or device 24 may communicate wirelessly using in-band or out-of-band communications. Device 12 may, for example, have wireless transceiver circuitry 40 that wirelessly transmits out-of-band signals (e.g., to device 18 or device 24) using an antenna. Wireless transceiver circuitry 40 may be used to wirelessly receive out-of-band signals from device 18 or 24 using the antenna. Device 24 may have wireless transceiver circuitry 46 that transmits out-of-band signals. Receiver circuitry in wireless transceiver 46 may use an antenna to receive out-of-band signals. Device 18 may have wireless transceiver circuitry 80 that transmits out-of-band signals. Receiver circuitry in wireless transceiver 80 may use an antenna to receive out-of-band signals. Wireless transceiver circuitry 40, 46, and 80 may also be used for in-band transmissions between devices 12, 24, and 18 using coils 36, 48, and 90.

Frequency-shift keying (FSK) and/or amplitude-shift keying (ASK) may be used to convey in-band data between devices 12, 18, and 24. Power may be conveyed wirelessly during these FSK and ASK transmissions.

It is desirable for power transmitting device 12, power transmitting and receiving device 18, and power receiving device 24 to be able to communicate information such as received power, battery states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects on the charging surface of the housing of device 12 (e.g., on the top of a charging mat or, if desired, to detect objects adjacent to the coupling surface of a charging puck). The housing of device 12 may have polymer walls, walls of other dielectric, and/or other housing wall structures that enclose coil(s) 36 and other circuitry of device 12. The charging surface may be formed by a planer outer surface of the upper housing wall of device 12 or may have other shapes (e.g., concave or convex shapes, etc.). In arrangements in which device 12 forms a charging puck, the charging puck may have a surface shape that mates with the shape of device 24. A puck or other device 12 may, if desired, have magnets that removably attach device 12 to device 24 (e.g., so that coil 48 aligns with coil 36 during wireless charging).

Circuitry 41 can detect foreign objects such as coils, paper clips, and other metallic objects and can detect the presence of wireless power receiving devices 24 (e.g., circuitry 41 can detect the presence of one or more coils 48 and/or magnetic core material associated with coils 48). During object detection and characterization operations, external object (foreign object) measurement circuitry 41 can be used to make measurements on coil(s) 36 such as Q-factor measurements, resonant frequency measurements, and/or inductance measurements that can indicate whether coil 48 is present and/or whether foreign objects such as coins or paperclips are present. Measurement circuitry can also be used to make sensor measurements using a capacitive sensor, can be used to make temperature measurements, and/or can otherwise be used in gathering information indicative of whether a foreign object or other external object (e.g., device 18 or 24) is present on device 12.

In some configurations, the control circuitry of device 12 (e.g., circuitry 41 and/or other control circuitry 16) can implement a power counting foreign object detection scheme. With this approach, device 12 receives information from device 24 (e.g., via in-band communications) indicating the amount of power that device 24 is wirelessly receiving (e.g., 4.5 W). Device 12 knows how much power (e.g., 5.0 W) is being transmitted (e.g., because device 12 knows the magnitude of the signal being used to drive coil 36 from inverter 61). By comparing the transmitted power (e.g., 5.0 W) to the received power (e.g., 4.5 W), device 12 can determine whether wireless power is being dissipated due to eddy currents flowing in a foreign object. If the dissipated power (e.g., 0.5 W in this example) is more than a predetermined threshold amount or if the efficiency of the wireless power transfer process is lower than expected, device 12 can conclude that a foreign object is present. Power counting techniques such as these may be used in conjunction with capacitive sensing foreign object detection techniques and/or other external object measurement operations performed using circuitry 41.

In some embodiments, measurement circuitry 41 of control circuitry 16 contains signal generator circuitry (e.g., oscillator circuitry for generating AC probe signals at one or more probe frequencies, a pulse generator that can create impulses so that impulse responses can be measured) and/or uses the transmission of wireless power signals from device 12 to energize the coils in system 8. Circuitry 41 may also include circuits (e.g., analog-to-digital converter circuits, filters, analog combiners, digital processing circuitry, etc.) to measure the response of system 8.

Power transmitting and receiving device 18 may be a wireless charging mat or puck that is coupled to a power adapter or other equipment by a cable, may be equipment that has been incorporated into furniture, a vehicle, or other system, may be a removable battery case, may be a portable electronic device such as a wrist watch, a cellular telephone, a laptop computer, a tablet computer, an accessory such as an earbud, or other electronic equipment. Power transmitting and receiving device 18 is capable of both transmitting and receiving wireless power. Power transmitting and receiving device 18 therefore may include power transmitting components, similar to power transmitting device 12. Power transmitting and receiving device 18 may also include power receiving components, similar to power receiving device 24.

Power transmitting and receiving device 18 may have an alternating-current (AC) to direct-current (DC) power converter such as AC-DC power converter 96 for converting AC power from a wall outlet or other power source into DC power. DC power may be used to power control circuitry 78. Control circuitry 78 includes wireless transceiver circuitry 80 for in-band communications (using coils 90) and out-of-band communications (using an antenna). Control circuitry 78 may also optionally include measurement circuitry 82 (e.g., measurement circuitry of the type described in connection with measurement circuitry 41).

Wireless power circuitry 84 in device 18 may include both an inverter 86 and a rectifier 88. Inverter circuitry 86 (e.g., formed from transistors) may be turned on and off based on control signals provided by control circuitry 78 to create AC current signals through one or more coils such as coil(s) 90. These coil drive signals cause coil(s) 90 to transmit wireless power. Coils 90 may be arranged in a planar coil array or may be arranged to form a cluster of coils. In some arrangements, device 18 may have only a single coil. In other arrangements, device 18 may have multiple coils (e.g., two or more coils, 5-10 coils, at least 10 coils, 10-30 coils, fewer than 35 coils, fewer than 25 coils, or other suitable number of coils).

As the AC currents pass through one or more coils 90, alternating-current electromagnetic (e.g., magnetic) fields (wireless power signals 44) are produced that are received by one or more corresponding receiver coils such as coil(s) 48 in power receiving device 24. In other words, one or more of coils 90 may be inductively coupled to one or more of coils 48.

Power transmitting and receiving device 18 may also receive wireless power (e.g., from power transmitting device 12). Coil(s) 90 may receive alternating-current electromagnetic fields from transmitting coils 36, resulting in corresponding alternating-current currents in coil(s) 90. Rectifier circuitry such as rectifier circuitry 88, which contains rectifying components such as synchronous rectification metal-oxide-semiconductor transistors arranged in a bridge network, converts received AC signals (received alternating-current signals associated with electromagnetic signals 44) from one or more coils 90 into DC voltage signals for powering device 18. The DC voltage produced by rectifier circuitry 88 can be used in charging a battery such as battery 94 and can be used in powering other components in device 18.

The depiction of alternating-electromagnetic fields between each type of device in FIG. 1 is merely illustrative (to show the type of inductive coupling that is possible). In practice, alternating-electromagnetic fields will only be conveyed between select devices within the system. For example, transmitting device 12 may transmit power to device 24 and device 18 (while device 18 does not separately transmit power to device 18). In another example, transmitting device 12 transmits power to device 18, which transmits power to 24 (without direct exchange of power from device 12 to device 24).

In some applications, power transmitting and receiving device 18 only transmits wireless power (e.g., using inverter 86 and coil(s) 90). In some applications, power transmitting and receiving device 18 only receives wireless power (e.g., using rectifier 88 and coil(s) 90). In some applications, power transmitting and receiving device simultaneously receives and transmits wireless power. When simultaneously receiving and transmitting wireless power, device 18 may optionally perform both the power transmitting and power receiving operations associated with inverter 86 and rectifier 88 (e.g., device 18 uses the rectifier to charge the battery and operate the device and independently uses the inverter to transmit a desired amount of power). Alternatively, device 18 may relay received wireless power signals without rectifying the power. Device 18 may include only one coil that is used for both wireless power transmission and wireless power reception. Alternatively, device 18 may have at least one dedicated wireless power transmitting coil and at least one dedicated wireless power receiving coil. Device 18 may have multiple coils that are all used for both wireless power transmission and wireless power reception. Different coils in device 18 may optionally be shorted together in different modes of operation.

Figure 2:
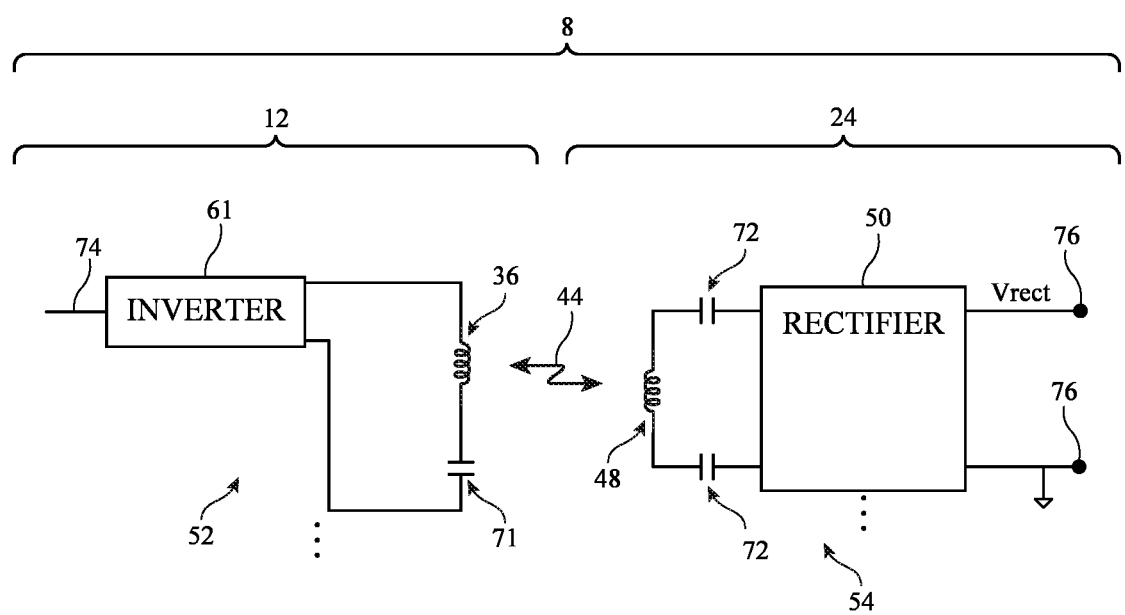
FIG. 2 is a circuit diagram of illustrative wireless power transmitting and receiving circuitry in accordance with an embodiment.

FIG. 2 is a circuit diagram of illustrative wireless charging circuitry for system 8. Wireless charging circuitry of a power transmitting device 12 and a power receiving device 24 is shown. However, it should be understood that device 18 may have the corresponding components for both power transmission and power reception and may be used in place of either device 12 and/or device 24 if desired. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 71. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically. For example, a pair of inverters 61 may produce output signals in phase or out of phase (e.g., 180 degrees out of phase).

The application of drive signals using inverter(s) 61 (e.g., transistors or other switches in circuitry 52) causes the output circuits formed from selected coils 36 and capacitors 71 to produce alternating-current electromagnetic fields (signals 44) that are received by wireless power receiving circuitry 54 using a wireless power receiving circuit formed from one or more coils 48 and one or more capacitors 72 in device 24.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 (e.g., a pair of coils) and converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24. In an illustrative configuration, device 24 may be a wristwatch or other portable device with at least two coils 48. These two (or more) coils 48 may be used together when receiving wireless power. Other configurations may be used, if desired.

As previously mentioned, in-band transmissions using coils 36 and 48 may be used to convey (e.g., transmit and receive) information between devices 12 and 24. With one illustrative configuration, frequency-shift keying (FSK) is used to transmit in-band data from device 12 to device 24 and amplitude-shift keying (ASK) is used to transmit in-band data from device 24 to device 12. In other words, a device transmitting wireless power may use FSK to transmit in-band data to a device receiving wireless power (regardless of whether either device is a dedicated power transmitting/receiving device 12/24 or a power receiving and transmitting device 18). A device receiving wireless power may use ASK to transmit in-band data to a device transmitting wireless power (regardless of whether either device is a dedicated power transmitting/receiving device 12/24 or a power receiving and transmitting device 18).

Power may be conveyed wirelessly from device 12 to device 24 during these FSK and ASK transmissions. While power transmitting circuitry 52 is driving AC signals into one or more of coils 36 to produce signals 44 at the power transmission frequency, wireless transceiver circuitry 40 may use FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 monitors the frequency of the AC signal passing through coil(s) 48 and uses FSK demodulation to extract the transmitted in-band data from signals 44. This approach allows FSK data (e.g., FSK data packets) to be transmitted in-band from device 12 to device 24 with coils 36 and 48 while power is simultaneously being wirelessly conveyed from device 12 to device 24 using coils 36 and 48.

In-band communications between device 24 and device 12 may use ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 36 while power is simultaneously being wirelessly conveyed from device 12 to device 24 using coils 36 and 48.

The example of FSK modulation being used to convey in-band data from power transmitting device 12 to power receiving device 24 and ASK modulation being used to convey in-band data from power receiving device 24 to power transmitting device 12 is merely illustrative. In general, any desired communication techniques may be used to convey information from power transmitting device 12 to power receiving device 24 and from power receiving device 24 to power transmitting device 12. In general, wireless power may simultaneously be conveyed between devices during in-band communications (using ASK or FSK).

The power transmission frequency used for transmission of wireless power may be, for example, a predetermined frequency of about 125 kHz, at least 80 kHz, at least 100 kHz, between 100 kHz and 205 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

It has been described that power may be simultaneously conveyed between devices while using in-band communication for data transmission between the devices. In other words, in some examples in-band communications may rely on modulation of the power transmission signal (e.g., modulating the power transmission frequency or modulating amplitude of a signal at the power transmission frequency). However, other communication techniques may be used that do not rely on modulation of the power transmission signals. For example, signals (sometimes referred to as in-band signals) may be conveyed between coils in the system at a frequency that is different than the power transmission frequency. Signals (at the same frequency or a different frequency than the power transmission frequency) that are conveyed using the coils (e.g., coils 36, 48, and 90) may be considered in-band signals.

Moreover, it should be noted that in-band communication may occur between devices before the devices agree upon a power transfer rate, power transmission frequency, etc. After initial detection and inductive coupling, devices may go through a handshake process to determine compatibility, negotiate power transfer frequency, negotiate power transfer rate, etc. During this process, in-band communication may involve FSK and/or ASK modulation of signals at the power transmission frequency. Therefore, wireless power is transmitted during this process. This is advantageous as it allows the devices to complete the handshake process even if the power receiving device has little or no remaining battery power. This transmission of wireless power during in-band communications may occur during the handshake process even if, ultimately, the negotiations between the devices result in no sustained transmission of wireless power (e.g., even if the devices do not enter a dedicated power transfer phase).

The aforementioned FSK and ASK modulation and demodulation techniques may be used to transmit data packets between any two devices within system 8. Each data packet may include numerous data bits (sometimes referred to as bits). The data bits may be grouped into bytes, with each byte including any desired number of bits (e.g., 8 bits).

At least one coil in power transmitting and receiving device 18 may be used for transmitting or receiving wireless power (depending on the conditions within the wireless charging system). However, the coil does not transmit and receive wireless power at the same time. Therefore, control circuitry within the device may be used to control whether the coil is used for transmitting or receiving wireless power at any given time.

A protocol may be used to determine whether a given coil in power transmitting and receiving device 18 is used for transmitting or receiving wireless power. The protocol may take into account many factors such as the type of devices in the wireless charging system, the battery charge levels of devices in the wireless charging systems, and/or whether the devices in the wireless charging system are coupled to additional power sources (e.g., tethered or untethered). The protocol may place a coil in power transmitting and receiving device 18 in the optimal mode for the given system conditions.

When a power transmitting and receiving device 18 is added to the wireless charging system, it may be desirable for the device to enter an appropriate mode and commence power transfer as quickly as possible. A user notification may also be output by one or more devices in the charging system to notify a user that the power transmitting and receiving device 18 has been added to the charging system. The user notification may indicate whether the power transmitting and receiving device 18 is being used to transmit and/or receive charge. Ideally, there is minimal latency between the device being added to the system and the user notification being output to the user. One way to minimize latency in most use cases is to assign each device a default mode. The default mode may correspond to the most likely mode for a coil that can either transmit or receive wireless charge.

Consider, for example, a cellular telephone with a wireless power coil that is configured to either transmit or receive charge. In most use cases, the cellular telephone may be used to receive wireless power (e.g., when the cellular telephone is placed on a charging mat). However, in some use cases, the cellular telephone may be used to transmit wireless power (e.g., to an additional electronic device). Because the most common use case is that the cellular telephone receives wireless power, the wireless power coil may have a default mode of receiving wireless power.

As another example, consider the example of a battery case with a wireless power coil that is configured to either transmit or receive charge. In most use cases, the battery case may be used to transmit wireless power (e.g., to a cellular telephone held by the case). However, in some use cases, the battery case may be used to receive wireless power (e.g., from a charging mat). Because the most common use case is that the battery case transmits wireless power, the wireless power coil may have a default mode of transmitting wireless power.

Figure 3:
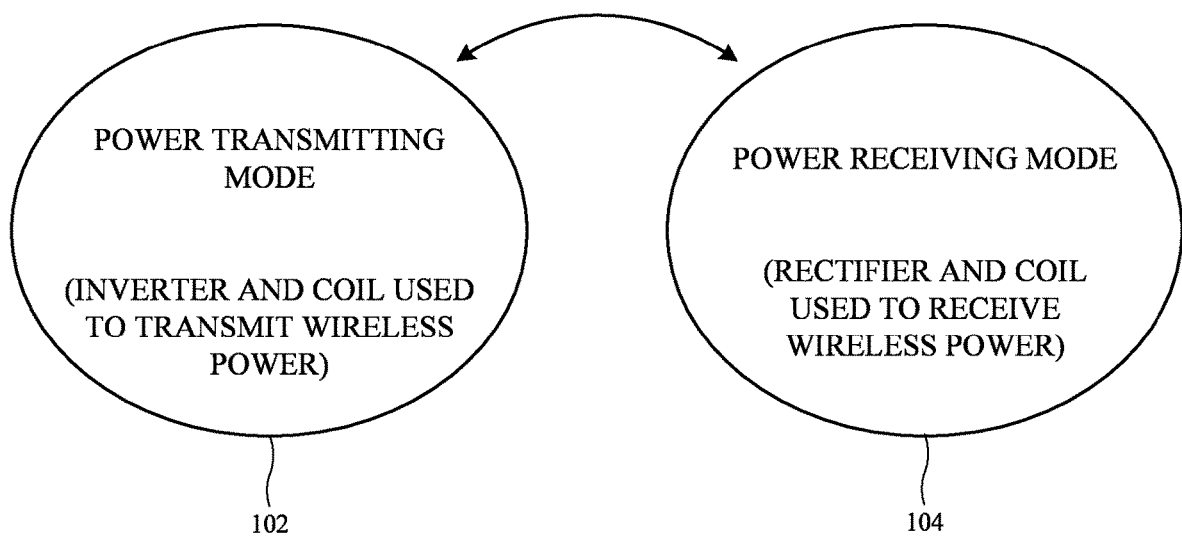
FIG. 3 is a state diagram of illustrative modes of operation for a wireless power transmitting and receiving device in accordance with an embodiment.

FIG. 3 is a state diagram showing how a power transmitting and receiving device may switch between a power transmitting mode and a power receiving mode. For simplicity, an example where the device includes a single coil will first be considered. In this example, the single coil may be used for either transmitting power in mode 102 or receiving power in mode 104. In the power transmitting mode 102, inverter 86 in wireless power circuitry 84 (see FIG. 1) may be used to transmit wireless power signals using the coil. The coil, wireless power circuitry, and/or overall device may be referred to as being in the power transmitting mode 102. In the power receiving mode 104, rectifier 88 in wireless power circuitry 84 (see FIG. 1) may be used to rectify wireless power signals received using the coil. The coil, wireless power circuitry, and/or overall device may be referred to as being in the power receiving mode 104.

In the power transmitting mode 102, rectifier circuitry (of rectifier 88) coupled to the coil may be disabled while the inverter circuitry (of inverter 86) is enabled. Similarly, in the power receiving mode 104, inverter circuitry (of inverter 86) coupled to the coil may be disabled while rectifier circuitry (of rectifier 88) is enabled.

In the power transmitting mode 102, wireless transceiver circuitry 80 may be configured to use frequency-shift keying (e.g., FSK modulation) to transmit information to the corresponding power receiving device using the coil while simultaneously transmitting wireless power to the power receiving device using the coil. In the power transmitting mode 102, wireless transceiver circuitry 80 may be configured to use amplitude-shift keying (e.g., ASK demodulation) to receive information from the corresponding power receiving device using the coil while simultaneously transmitting wireless power to the power receiving device using the coil. In the power receiving mode 104, wireless transceiver circuitry 80 may be configured to use amplitude-shift keying (e.g., ASK modulation) to transmit information to the corresponding power transmitting device using the coil while simultaneously receiving wireless power from the power transmitting device using the coil. In the power receiving mode 104, wireless transceiver circuitry 80 may be configured to use frequency-shift keying (e.g., FSK demodulation) to receive information from the corresponding power transmitting device using the coil while simultaneously receiving wireless power from the power transmitting device using the coil. This example is merely illustrative. In general, any desired communication scheme may be used.

The example of device 18 having a single coil that is either in a power transmitting mode or power receiving mode is merely illustrative. In general, device 18 may have any desired number of coils. Some of the coils may only transmit wireless power. Some of the coils may only receive wireless power. Some of the coils may either transmit or receive wireless power. Of the coils that transmit or receive wireless power, the control circuitry may control the operating mode of the coils collectively or individually. Herein, for simplicity, an example is described of a power transmitting and receiving device 18 with a single coil that either transmits or receives wireless power.

As previously mentioned, a device may have an associated default mode for each coil that is capable of operating in either a transmitting or receiving mode. When two power transmitting and receiving devices are placed adjacent to one another (e.g., aligning coils in the two devices for wireless power transfer), the devices may attempt to establish a power transfer link. In one illustrative scheme, the devices could be randomly assigned a role (e.g., power transmitter or power receiver). However, instead of assigning initial roles randomly, using the default roles as discussed above may minimize the time for establishing a power transfer link and notifying the user of the link between the devices. Accordingly, during the identification, configuration, and/or negotiation phases between the two devices, each device may assume its default role. If the real-time conditions of the wireless charging system dictate that the devices be in their non-default roles, one of the devices may request a role swap (sometimes referred to as mode change). For example, a default power receiver may switch to a power transmitting mode and/or a default power transmitter may switch to a power receiving mode. The role swap may occur either before or during a power transfer phase.

Figure 4A:
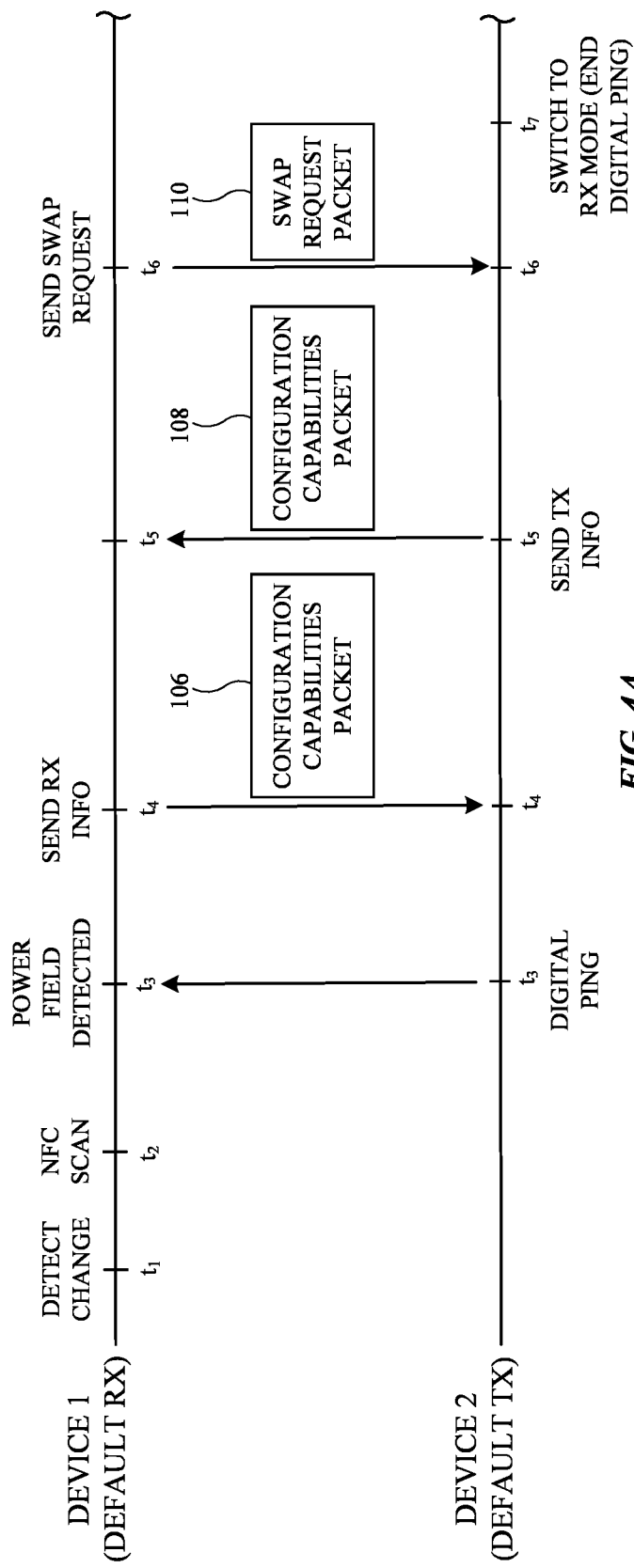
FIGS. 4A and 4B are a timing diagram showing how a default power receiving device may be placed adjacent to a default power transmitting device and ultimately swap roles in accordance with an embodiment.
Figure 4B:
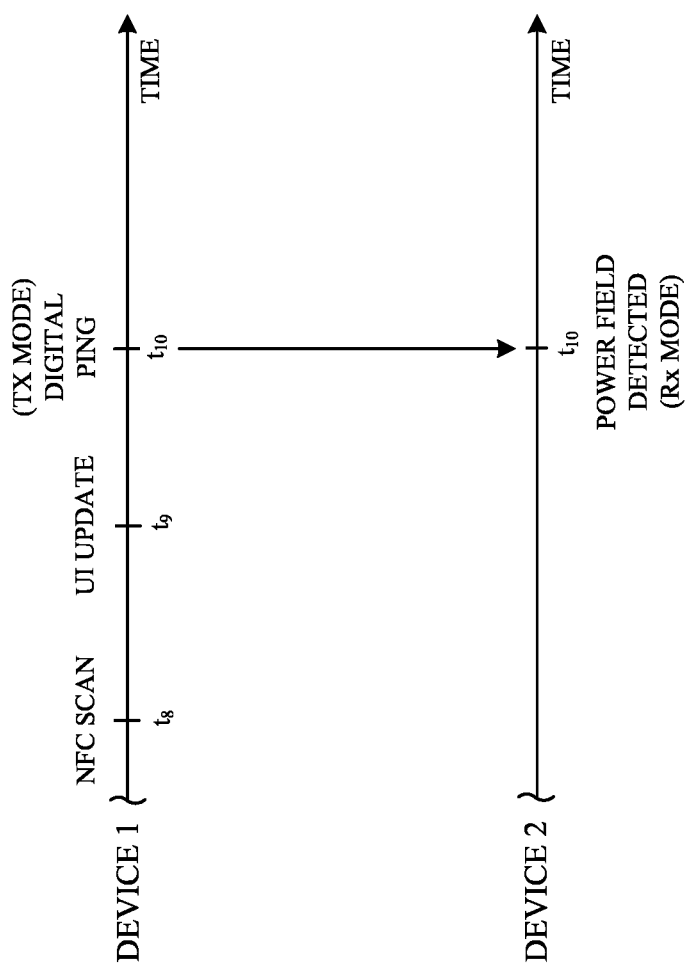

FIGS. 4A and 4B are timing diagrams showing how devices may start in their default roles and ultimately switch roles before starting a power transfer phase. In the example of FIGS. 4A and 4B, a first device (device 1) is placed adjacent to a second device (2). Both device 1 and device 2 may be power transmitting and receiving devices and therefore capable of operating in both a power transmitting mode and power receiving mode. Device 1 may be a cellular telephone that has a default mode of a power receiving mode. Device 2 may be a battery case that has a default mode of a power transmitting mode. Therefore, device 1 initially operates as a power receiving device and device 2 initially operates as a power transmitting device.

As shown in FIG. 4A, device 1 may detect the presence of an additional device at ti. Device 1 may detect the additional device using a change in a sensor within device 1. For example, input-output components 92 (as in FIG. 1) of device 1 may include a sensor that is sensitive to electromagnetism such as a near-field communications (NFC) coil or Hall effect sensor (a sensor that measures the magnitude of a magnetic field). As another example, the input-output components 92 may include an accelerometer that is configured to detect when device 1 bumps into an additional device (e.g., device 2). Device 1 may also detect device 2 using the wireless power coil itself (e.g., coil 90 that is also used to transmit or receive wireless power). In general, input from any subset (e.g., one or more) of the aforementioned components may be used to detect the presence of device 2.

Once device 2 is detected at ti, device 1 may optionally initiate an NFC scan at t 2. The NFC scan may be used to identify the device type of device 2 and/or obtain other information from device 2.

Device 2 is operating as a transmitting device based on its default mode. Device 2 may detect the presence of device 1 similarly to how device 1 detects the presence of device 2 (e.g., using the coil, a sensor that is sensitive to electromagnetism, using an accelerometer, etc.). Ultimately, device 2 may enter a ping phase (to determine if the additional device detected is a compatible device for wireless charging operations). During the ping phase, device 2 attempts to establish communication with device 1. As shown, at t 3, device 2 may execute a digital ping during which a power signal is applied to the coil in device 2. The term digital ping may refer to a longer ping that powers up the receiver device (as opposed to an analog ping that may be used to initially detect the presence of the receiver device). The term ping may sometimes be used in place of digital ping for simplicity. If a compatible power receiver is indeed present (as in FIG. 4A), the receiver may detect the power field from the digital ping and provide a response (e.g., via ASK in-band communication) and the devices may enter an identification and configuration phase. If no compatible power receiver were present, the power transmitter (device 2) may revert to a selection phase (in which the transmitter monitors for adjacent objects that may potentially be power receivers).

In FIG. 4A, device 1 receives the digital ping at t 3 and the devices enter an identification and configuration phase. During the identification and configuration phase, devices 1 and 2 may exchange information such as the amount of power wanted by the receiver, the amount of power available from the transmitter, etc. A negotiation phase may also occur during which a power transfer amount is negotiated and agreed upon by both devices. Once the devices agree upon a power transfer level, the devices will enter a power transfer phase during which sustained wireless power transfer occurs at the agreed upon power transfer level. The communications before the power transfer phase may collectively be referred to as a configuration phase, identification and configuration phase, identification phase, negotiation phase, handshaking phase, etc. Alternatively or in addition, the communications before the power transfer phase may be grouped into different phases (e.g., a configuration phase, an identification phase, and a negotiation phase).

As shown in FIG. 4A, at t 4 device 1 may send a configuration/capabilities packet 106 (sometimes referred to as simply configuration packet 106 or capabilities packet 106) to device 2. Because device 1 is operating in a receiving mode, the packet may be sent from device 1 using ASK modulation (e.g., by modulating a power signal received from device 2 as part of the digital ping) while device 1 simultaneously receives wireless power from device 2. The configuration/capabilities packet may include at least one bit that indicates whether or not the receiver is capable of swapping modes (e.g., switching from a receiving mode to a transmitting mode). As one example, a dedicated power receiving device (e.g., device 24 in FIG. 1) may set this bit equal to '0' and a power transmitting and receiving device (e.g., device 18 in FIG. 1) may set this bit equal to '1'.

The bit indicative of the receiving device's swap capabilities may be incorporated into a configuration packet that includes other information such as power class, maximum power value, window size, window offset, a 'Prop' bit, a 'Neg' bit, a polarity bit that provides information regarding FSK polarity, depth bits used to select FSK modulation depth, and/or a count identifying how many optional configuration packets will be transmitted. Alternatively, the bit indicative of the receiving device's swap capabilities may be incorporated into a dedicated packet that includes other information relevant to the potential role swapping of the device (e.g., state of charge information, whether or not the device is tethered to wired power, etc.).

At t 5 device 2 may send a configuration/capabilities packet 108 (sometimes referred to as simply configuration packet 108 or capabilities packet 108) to device 1. Because device 2 is operating in a transmitting mode, the packet may be sent from device 2 using FSK modulation while simultaneously transmitting wireless power to device 1 (e.g., by modulating the power signal used for the digital ping). The configuration/capabilities packet may include at least one bit that indicates whether or not the transmitter is capable of swapping modes (e.g., switching from a transmitting mode to a receiving mode). As one example, a dedicated power transmitting device (e.g., device 12 in FIG. 1) may set this bit equal to '0' and a power transmitting and receiving device (e.g., device 18 in FIG. 1) may set this bit equal to '1'.

The bit indicative of the transmitting device's swap capabilities may be incorporated into a capabilities packet that includes other information such as negotiable load power, potential load power, and/or buffer size. Alternatively, the bit indicative of the transmitting device's swap capabilities may be incorporated into a dedicated packet that includes information relevant to the potential role swapping of the device (e.g., state of charge information, whether or not the device is tethered to wired power, etc.).

Once the devices have exchanged the swap capability information and other pertinent information, control circuitry within one or both devices may determine whether or not to initiate a role swap. Based on the real-time conditions, it may sometimes be desirable for device 1 to swap from its default receiving mode to a transmitting mode and transmit wireless power to device 2 (which would swap from its default transmitting mode to a receiving mode). Either device 1 or device 2 may initiate a swap request based on the real time conditions. In one example, control circuitry in the receiving device use a power protocol to determine whether a role swap is appropriate. The receiving device may, based on the information regarding the transmitter capabilities and other information, in some cases determine that a role swap is appropriate.

After determining that a role swap is appropriate, device 1 may send a swap request packet 110 at $t_6$. The swap request packet may include a reason for the swap request. As one example, device 1 may be tethered to a wired power source. The power protocol may dictate that device 1 serves as a transmitter in this condition. Therefore, the swap request packet 110 may include the presence of the tether as the reason for the swap.

Device 2 may accept the power swap request and switch to a receiver mode at t 7. Device 2 may optionally send an acknowledgement back to device 1 indicating that the swap request is accepted. In some instances, device 2 may choose to deny the swap request (e.g., if device 2 is also tethered and therefore does not need to receive wireless power). While switching to the receiver mode, device 2 may end the digital ping (which was used for in-band communication between $t_3$ and $t_7$).

As show in FIG. 4B (which is simply a continuation of the timing diagram of FIG. 4A), device 1 may optionally start an NFC scan at $t_8$. The NFC scan may be used to identify the device type of device 2 and/or obtain other information from device 2.

At $t_9$, device 1 may perform a user interface (UI) update. The user interface update may include a user notification that is output to the user (e.g., using a display, status indicator light, speakers, haptic output device, or another desired input-output component). The user notification may indicate that the power transmitting and receiving device is operating in a transmitting mode. The user notification may also include information such as the state of charge of a battery in device 2 and/or the state of charge of the battery of device 1.

At $t_{10}$, now in the power transmitting mode, device 1 may enter a digital ping phase during which a power signal is applied to the coil in device 1. Device 2 (now in the power receiving mode) may detect the power field from the digital ping and provide a response (e.g., via ASK in-band communication). The devices may enter an identification and configuration phase, negotiate a power transfer level, and ultimately enter a power transfer phase with sustained wireless power transfer at the negotiated level.

It should be noted that the user interface update at $t_9$ may be designed to optimize user experience. In other words, the user interface update need not reflect the actual modes and timing of the operation of device 1. In practice, device 1 is operating in a power receiving mode and is receiving power signals (from the digital ping) between t 3 and $t_6$. However, since this initial mode may be later changed before entering a power transfer phase (as is the case in FIGS. 4A and 4B), the user notification may not yet be output.

Once device 1 switches modes from a receiving mode to a transmitting mode, the user notification may be output (even before device 1 enters a power transfer phase with device 2). Once device 1 sends the swap request at $t_6$, it is known that device 1 will ultimately be operating in a power transmitting mode. Similarly, all information regarding device 2 (e.g., state of charge information, device type information) is known by $t_6$. Therefore, at $t_6$ device 1 may begin loading the user interface update and output the user notification as soon as possible (to minimize latency between the devices being placed together and the notification being output). In this example it takes the time between $t_6$ and $t_9$ for the user notification to be prepared and loaded. Once ready, the user notification is output at $t_9$. Again, the user notification may indicate that device 1 is actively transferring power to device 2 even though the devices have not negotiated and entered a power transfer phase yet.

To summarize, the user notification may be designed to reflect the expected final outcome of the wireless power exchange between the two devices. The user notification may be output based on the expected final outcome before the final outcome is actually achieved, and the user notification may not reflect intermediate states that occur before the final outcome. This scheme optimizes the experience for the user.

Figure 5:
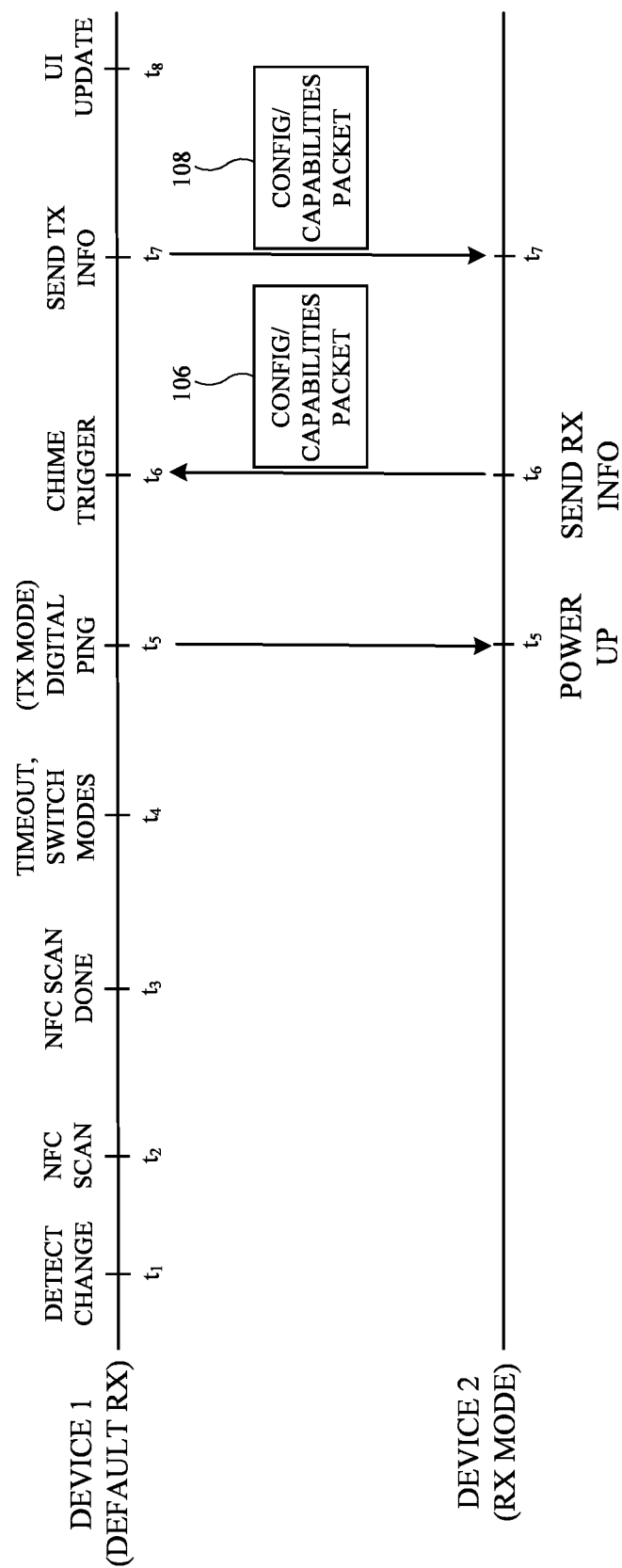
FIG. 5 is a timing diagram showing how a default power receiving device may be placed adjacent to another power receiving device and ultimately switch to a power transmitting mode in accordance with an embodiment.

FIG. 5 is a timing diagram showing another example of a device starting in a default role and ultimately switching roles before starting a power transfer phase. In the example of FIG. 5, a first device (device 1) is placed adjacent to a second device (2). Device 1 may be a power transmitting and receiving device and is therefore capable of operating in both a transmitting mode and receiving mode. Device 2 may be a dedicated power receiving device (e.g., an accessory that only receives wireless power) or a power transmitting and receiving device with a dead battery (that therefore can only receive power at this time). Device 1 may be a cellular telephone that has a default mode of a power receiving mode. Device 2 may be an accessory that is a dedicated wireless power receiver. Therefore, device 1 initially operates as a power receiving device and device 2 also initially operates as a power receiving device.

As shown in FIG. 5, device 1 may detect the presence of an additional device at ti. Device 1 may detect the additional device using a change in a sensor within device 1 (e.g., a sensor that is sensitive to electromagnetism such as an NFC coil or Hall effect sensor, an accelerometer, etc.) or a change detected by the wireless power coil. Once device 2 is detected at ti, device 1 may optionally initiate an NFC scan at t 2. The NFC scan may be used to (attempt to) identify the device type of device 2 and/or obtain other information from device 2. However, in this case device 2 may not have NFC communication functionality (either because device 2 is a dedicated receiver without NFC communication capabilities or device 2 has a dead battery and cannot communicate). Therefore, the NFC scan may conclude at t 3 without communicating with device 2.

The lack of communication during the NFC scan is indicative of the state of device 2. This information, in combination with the detected change at ti indicating the presence of a device, may be used by device 1 to determine that device 2 is only capable of receiving wireless power at present conditions. At $t_4$, after a predetermined length of time has passed from initial detection at ti without receiving a digital ping from the detected device, device 1 may 'timeout' and switch modes from the default power receiving mode to a power transmitting mode. The timeout may be sufficiently long to guarantee that device 1 would have received a digital ping (if device 2 was indeed operating in a transmitting mode). Once the timeout period expires without receiving the digital ping, device 1 switches from its default role into a power transmitting mode. The timeout period may be any desired length of time (e.g., more than 300 milliseconds, more than 400 milliseconds, more than 500 milliseconds, more than 1 second, less than 1 second, between 300 milliseconds and 700 milliseconds, between 450 milliseconds and 550 milliseconds, etc.).

After switching to the power transmitter mode, device 1 may enter a digital ping phase at is during which a power signal is applied to the coil in device 1. Device 2 (which is in a receiving mode) may detect the power field from the digital ping and provide a response (e.g., via ASK in-band communication).

As shown in FIG. 5, device 2 receives the digital ping at is and the devices enter an identification and configuration phase. During the identification and configuration phase, devices 1 and 2 may exchange information such as the amount of power wanted by the receiver, the amount of power available from the transmitter, etc. A negotiation phase may also occur during which a power transfer amount is negotiated and agreed upon by both devices.

As shown in FIG. 5, at $t_6$ device 2 may send a receiver configuration/capabilities packet 106 to device 1. Because device 2 is operating in a receiving mode, the packet may be sent from device 2 using ASK modulation (e.g., by modulating a power signal received from device 1 as part of the digital ping) while simultaneously receiving wireless power from device 1. The configuration/capabilities packet may include at least one bit that indicates whether or not the receiver is capable of swapping modes (e.g., switching from a power receiving mode to a power transmitting mode).

At t 7 device 1 may send a transmitter configuration/capabilities packet 108 to device 2. Because device 1 is operating in a transmitting mode, the packet may be sent from device 1 using FSK modulation while simultaneously transmitting wireless power to device 2 (e.g., by modulating the power signal used for the digital ping). The configuration/capabilities packet may include at least one bit that indicates whether or not the transmitter is capable of swapping modes (e.g., switching from a power transmitting mode to a power receiving mode).

When device 1 receives the capabilities packet 106 at $t_6$, device 1 has sufficient information to prepare and load a user notification to update the charging state of device 1. Similar to as discussed in connection with FIGS. 4A and 4B, the user notification may be prepared and loaded before the devices actually enter the power transfer phase. At $t_6$ in FIG. 5, device 1 knows that it will be transferring power to device 2 and knows any additional necessary information from device 2 (e.g., state of charge information, device type, etc.). Therefore, the user notification (sometimes referred to as a chime) may be initiated at $t_6$.

The user interface update may be performed at t 8 (e.g., as soon as possible once loaded). It should be noted that user interface updates (e.g., as described in connection with device 1 in FIGS. 4 and 5) may also occur in device 2. The device 2 user interface updates may occur either synchronously or asynchronously with the device 1 user interface updates. In some cases, devices 1 and 2 may synchronously output an audio, visual, and/or haptic indicator.

The user notification (e.g., output) from devices 1 and 2 may include one or more of audio feedback, visual feedback, haptic feedback, and any other desired type of feedback. For example, the devices may use input-output devices such as a display (e.g., to display an animation or other visual feedback), a status indicator light (e.g., to provide visual feedback) a speaker (e.g., to provide an audio indicator), or a vibrator (e.g., to provide haptic feedback) in the user notification (sometimes referred to as an indicator or output). Different devices may provide different feedback. For example, a cellular telephone and wristwatch may use the display to display an animation and use a vibrator to provide haptic feedback. A battery case for earbuds may use a status indicator light to provide visual feedback.

The example of an NFC scan in FIGS. 4 and 5 is merely illustrative. In general, any desired communication (e.g., Bluetooth communications) may be used in place of the NFC scan.

As previously discussed, the configuration/capabilities packets 106 and 108 may optionally be dedicated packets for transmitting information relevant to the capabilities/configuration/status of the device. FIG. 6 is a diagram of an illustrative packet that may be used for either packet 106 or packet 108. As shown, the packet includes a first byte ($B_0$) with a bit ($b_7$) that indicates whether or not the device (e.g., the device sending the packet) is capable of swapping roles (e.g., switching from a power transmitting mode to a power receiving mode or vice versa). As one example, the swap bit may be a first value ('1') when the device is a power transmitting and receiving device and the swap bit may be a second value ('0') when the device is a dedicated power transmitting device or a dedicated power receiving device.

The first bye also includes a bit ($b_6$) that indicates whether or not the device is tethered. As one example, the tethered bit may be a first value ('1') when the device has a connection to an external power source (e.g., plugged into a wall outlet). The connection to external power may normally be wired but in some cases may be wireless. The tethered bit may be a second value ('0') when the device does not have a connection to an external power source (e.g., is not plugged into a wall outlet). Bits $b_0$ through $b_5$ are reserved.

The packet may also include a byte ($B_1$) with at least one bit (e.g., $b_0$ through $b_6$ in FIG. 6) for conveying the state of charge (battery level) of a battery within the device. There may be a predetermined value that indicates that the device does not have a battery (e.g., for power transmitters without an internal battery). Otherwise, the battery level represents the current state of charge of the device battery.

FIG. 7 is a diagram of an illustrative packet that may be used for a swap request (sent by either a power transmitter or power receiver). As shown, packet 110 may include one byte with a plurality of bits (e.g., bits $b_0$ through $b_7$) that are used to identify a reason for the swap request. Reasons for the swap request may include a power source change (e.g., the device is newly tethered or the device is newly untethered), a battery level increase, a battery level decrease, a user requested change, etc. The user requested change may occur when the user uses input-output components within the device to manually swap the power mode of the device (e.g., from a power transmitting mode to a power receiving mode or vice versa).

A power role swap may occur either before a power transfer phase or during a power transfer phase. The need for a power role swap may be determined according to a power protocol that identifies circumstances sufficient to warrant a role swap. There are many types of guidelines that may be used by the power protocol to make power role determinations. As one example, it may be preferred for tethered devices (e.g., devices coupled to an external power source such as a wired power source) to operate in a power transmitting mode to charge other devices. If a power transmitting and receiving device that is a default power receiver is tethered, the power protocol may suggest swapping the power transmitting and receiving device from the power receiving mode to the power transmitting mode.

As another example, it may be preferred for devices with higher battery charge level to be in a power transmitting mode and devices with lower battery levels to be in a power receiving mode. The battery charge levels (e.g., states of charge) may be compared to both predetermined thresholds and/or each other. For example, there may be a first state of charge threshold used to identify 'high' state of charge devices (e.g., 80%, 90%, 95%, more than 80%, more than 50%, between 60% and 90%, etc.). A device having a state of charge greater than the threshold may be considered a high state of charge device. Similarly, there may be a second state of charge threshold used to identify 'low' state of charge devices (e.g., 40%, 30%, 20%, 10%, 5%, less than 30%, less than 50%, between 1% and 30%, etc.). A device having a state of charge lower than the threshold may be considered a low state of charge device. Devices having a high state of charge may be preferred to be power transmitters whereas devices having a low state of charge may be preferred to be power receivers.

The state of charge of two devices may also be compared to each other. The device having a higher state of charge may be preferred to be a power transmitter and the device having a lower state of charge may be preferred to be a power receiver. In some cases, the state of charge difference may need to be greater than a threshold magnitude to warrant a role swap. For example, consider the example of a laptop computer that is capable of both transmitting and receiving wireless power and a cellular telephone that is capable of both transmitting and receiving wireless power. The laptop computer may be a default power transmitter whereas the cellular telephone may be a default power receiver. If the laptop computer's state of charge is 50% and the cellular telephone's state of charge is 55%, the devices may maintain their default roles and the laptop may transfer wireless power to the cellular telephone. If the laptop computer's state of charge is 10% and the cellular telephone's state of charge is 90%, the devices may switch from their default roles and the cellular telephone may transfer wireless power to the laptop computer. In the 10%/90% example, the difference in state of charge may be greater than a threshold (e.g., 10%, 20%, 30%, 40%, 50%, between 5% and 60%, less than 50%, etc.). The difference in state of charge may be used in combination with the status of one or more devices as high or low state of charge devices to determine whether a role swap is appropriate.

Figure 8:
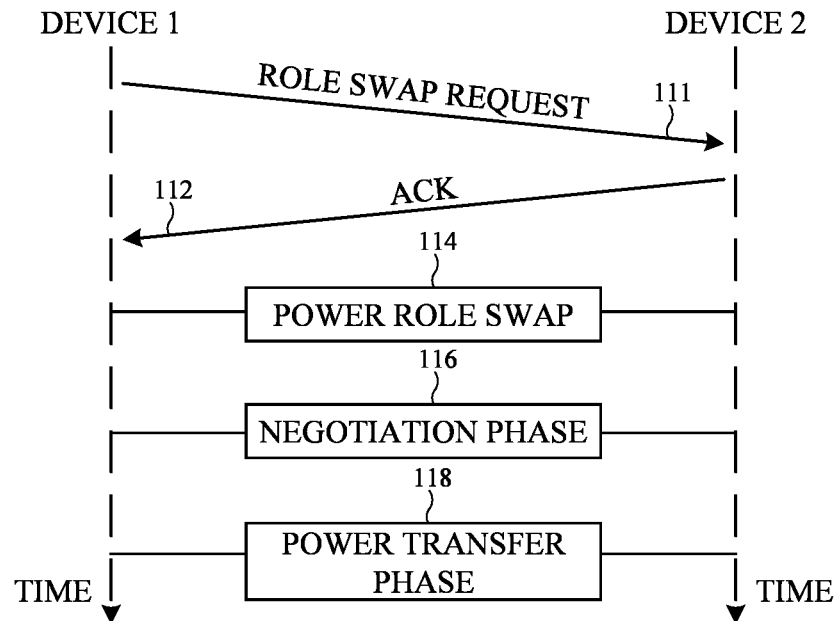
FIG. 8 is a timing diagram showing how a power role swap may occur before a power transfer phase in accordance with an embodiment.
Figure 9:
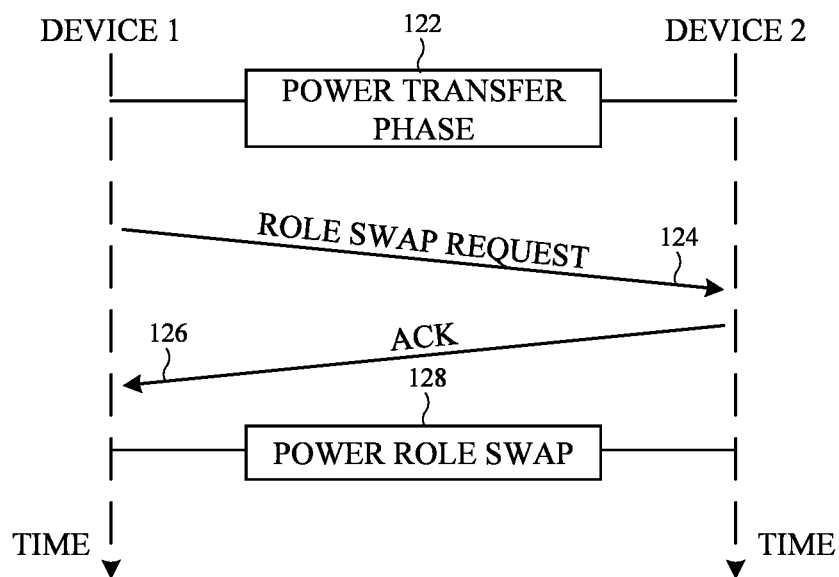
FIG. 9 is a timing diagram showing how a power swap may occur during a power transfer phase in accordance with an embodiment.

FIGS. 8 and 9 are diagrams showing how a role swap request may be sent either before or during a power transfer phase. FIG. 8 shows an example of a role swap occurring before a power transfer phase. First, a role swap request 111 may be sent from device 1 to device 2. The role swap request 111 may include a packet (e.g., packet 110 in FIG. 7) with a reason for the swap request. After receiving the request, device 2 may send a response 112 (acknowledgement) accepting the swap request. Accordingly, the devices swap power roles at power role swap 114. Once the power roles have swapped, the devices may proceed to the negotiation phase 116. An identification and configuration phase may also be included after the power role swap if desired. Finally, after the devices have agreed upon a power transfer level, the devices may enter the power transfer phase 118 (during which sustained power transmission occurs).

FIG. 9 shows an example of a role swap occurring during a power transfer phase. As shown, the devices may be in a power transfer phase 122 (e.g., sustained power transmission at an agreed upon power level). Then, while wireless power is being transmitted, a role swap request 124 may be sent from device 1 to device 2. The role swap request 124 may include a packet (e.g., packet 110 in FIG. 7) with a reason for the swap request. After receiving the request, device 2 may send a response 126 (acknowledgement) accepting the swap request. Accordingly, the devices swap power roles at power role swap 128. After swapping power roles, the devices may proceed through one or more of identification, configuration, and negotiation phases and ultimately commence a new power transfer phase using the new roles.

In FIGS. 8 and 9, device 1 may start either in a power transmitting mode or power receiving mode. Similarly, device 2 may start either in a power transmitting mode or power receiving mode.

As a first example of a situation where a role swap may occur, consider an example where a tethered cellular telephone is placed adjacent to an untethered battery case. The cellular telephone may default to a power receiving mode and the battery case may default to a power transmitting mode. Inductive coupling (sometimes referred to as an inductive link) may be established with the devices in their default modes (e.g., using a digital ping transmitted from the battery case to the cellular telephone). Using the inductive coupling, the devices may exchange capability information (e.g., state of charge information, tether status information, device type information, swap capability information, etc.). Based on the exchanged information, control circuitry in one or both devices may generate an instruction to swap roles based on a power protocol. In this case, it is preferred for the tethered cellular telephone to be a power transmitter. Therefore, the cellular telephone sends a swap request to the battery case. The battery case accepts the request and the devices swap roles. After swapping roles, the cellular telephone transmits wireless power to the battery case.

While the cellular telephone transmits wireless power to the battery case, the cellular telephone may switch from the tethered state to the untethered state (e.g., the cellular telephone may be disconnected from a wired power source). This change in status of the cellular telephone may be conveyed from the cellular telephone to the battery case (e.g., using a capabilities packet 108). Based on the updated status of the cellular telephone, control circuitry in one or both devices may generate an instruction to swap roles based on a power protocol. Now that the cellular telephone is no longer tethered, it may be desired for the cellular telephone to revert to its default role as a power receiver. Therefore, the devices may swap roles. After swapping roles, the battery case transmits wireless power to the cellular telephone.

As another example of a situation where a role swap may occur, consider an example where a first untethered cellular telephone is placed adjacent to a second untethered cellular telephone. The cellular telephones may both default to a power receiving mode. In this case, the cellular telephone with the higher state of charge may swap to a power transmitting mode and transmit wireless power to the cellular telephone with the lower state of charge.

Figure 10:
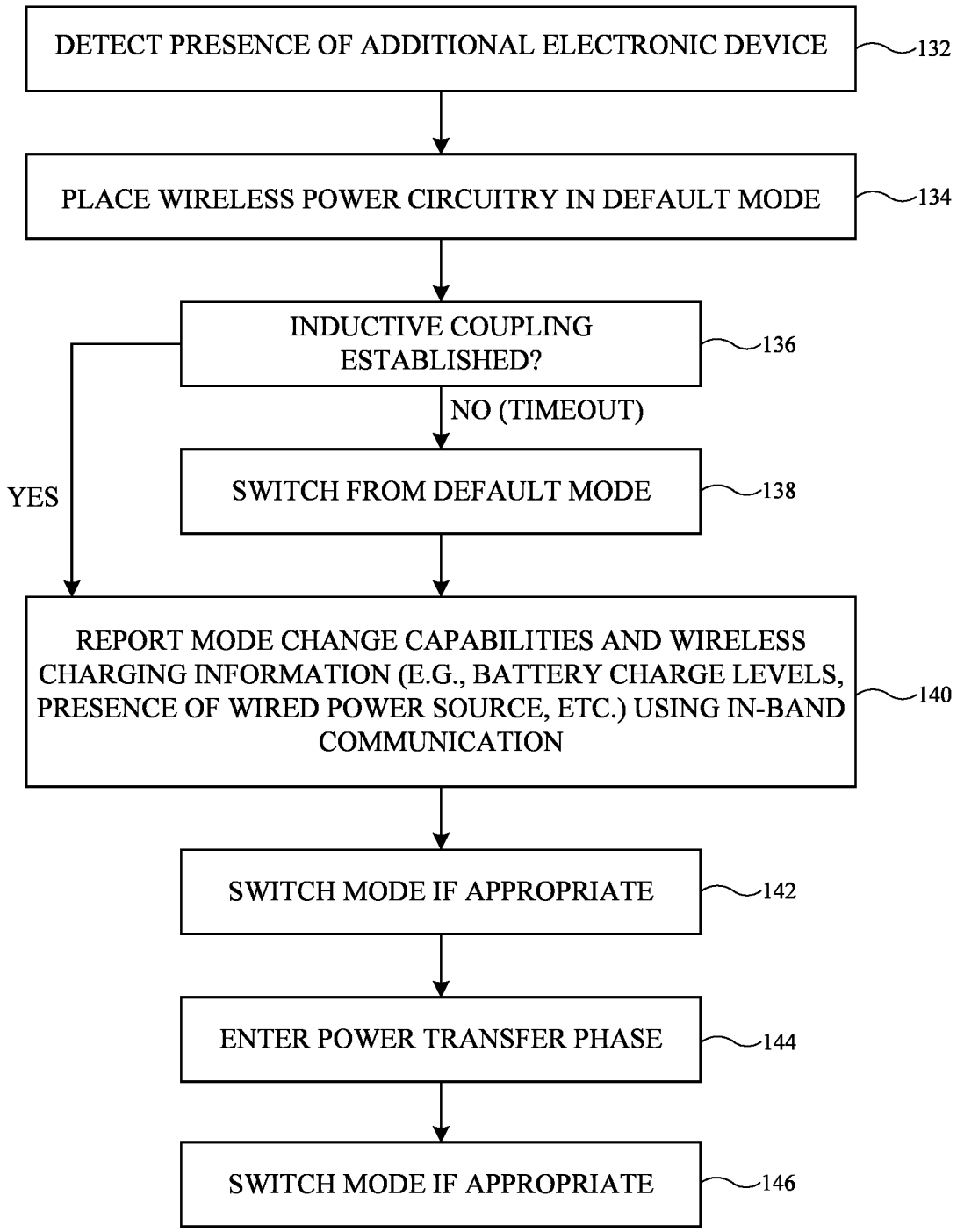
FIG. 10 is a flowchart of illustrative method steps for operating a power transmitting and receiving device in accordance with an embodiment.

FIG. 10 is a flowchart showing illustrative method steps for operating a power transmitting and receiving device (e.g., device 18 in FIG. 1) during coupling with another device. As shown, at step 132 the power transmitting and receiving device may detect the presence of an additional electronic device (e.g., using a wireless power coil 90 or another component such as an accelerometer, Hall effect sensor, NFC coil, etc.). In response to detecting the additional electronic device, the wireless power circuitry and wireless power coil in device 18 may enter a configuration phase and may be placed in a default mode at step 134. The default mode may be the mode device 18 (and specifically a wireless power coil and corresponding wireless power circuitry in the device) reverts to every time device 18 is placed adjacent an external electronic device (e.g., each time device 18 newly enters the configuration phase with a newly detected device). In other words, each time an additional device is detected at step 132, the coil and wireless power circuitry are placed in the same default mode (e.g., power receiving mode 104 or power transmitting mode 102). It should be noted that, if an untethered power transmitting and receiving device has a battery that is dead (e.g., no charge level remaining), the device is necessarily in a receiving mode as there is no power with which to detect an additional device and enter a configuration phase in a transmitting mode.

After the wireless power circuitry is placed in the default mode, the device may attempt to establish inductive coupling with the additional electronic device (e.g., by transmitting or receiving a digital ping). If the inductive coupling is established at step 136, the method may proceed to step 140. When the default mode is a power transmitting mode, the device may know the inductive coupling is established upon receiving a packet from the additional device (e.g., an ASK packet) in response to the transmitted digital ping. When the default mode is a power receiving mode, the device may know the inductive coupling is established upon receiving a digital ping from the additional device.

If the inductive coupling is not established within a predetermined period of time (e.g., the timeout threshold discussed in connection with FIG. 5), the method may proceed to step 138. At step 138, the device may switch the mode of the wireless power circuitry and coil from the default mode to an alternate mode. In other words, control circuitry in the power transmitting and receiving device is configured to interpret the timeout as an instruction representing a mode change. If the default mode is a power transmitting mode, the device may switch from the power transmitting mode to a power receiving mode. If the default mode is a power receiving mode, the device may switch from the power receiving mode to a power transmitting mode. After switching from the default mode at step 138, the power transmitting and receiving device would aim to again establish inductive coupling with the additional electronic device. Assuming the inductive coupling is established, the method proceeds to step 140.

At step 140, in-band communication may be used for the power transmitting and receiving device and additional electronic device to exchange information such as mode change capabilities (e.g., is the device capable of changing modes) and wireless charging information (e.g., state of charge information, tethering information, device type, etc.). Packets 106 and 108 shown and discussed in connection with FIGS. 4-6 may be used to exchange some or all of this information. The devices may each transmit a packet that include at least one bit representative of the role swap capabilities of that device.

After exchanging the information in step 140, the devices may switch modes if appropriate at step 142. The optional mode switch may be determined based on a power protocol used by control circuitry in one or both devices. Control circuitry in the power transmitting and receiving device may interpret output from the power protocol as an instruction representing a mode change. The mode change may occur before the power transfer phase commences. The device may switch from the default mode responsive to the state of charge of one or both devices, responsive to one of the devices being coupled to a wired power source, etc. As a specific example, a default wireless power receiver may switch to a wireless power transmitting mode if the default wireless power receiver is coupled to a wired charging source such as main power.

Next, at step 144, the devices may enter a power transfer phase (e.g., at a negotiated power transfer level). During the power transfer phase, the devices may switch modes if appropriate at step 146. This optional mode switch may be determined based on a power protocol used by control circuitry in one or both devices. Control circuitry in the power transmitting and receiving device may interpret output from the power protocol as an instruction representing a mode change. The device may switch from the default mode responsive to the state of charge of one of the devices dropping below a predetermined threshold, responsive to the power receiving device being coupled to a wired power source, etc.

A battery-powered device may transmit its state of charge to a power receiving device using in-band communication. Both dedicated power transmitting devices (e.g., device 12 in FIG. 1) and power transmitting and receiving devices (e.g., device 18 in FIG. 1) may include batteries. These devices may operate in a power transmitting mode during which wireless power is transmitted to an additional electronic device. To allow for user interface updates, role swaps within the wireless charging system, and/or to notify a user of an end of power transfer, the device in the power transmitting mode may transmit its battery state of charge to the power receiving device using in-band communication (e.g., FSK modulation) using a coil while simultaneously transmitting wireless power to the power receiving device using the coil.

Figure 11:
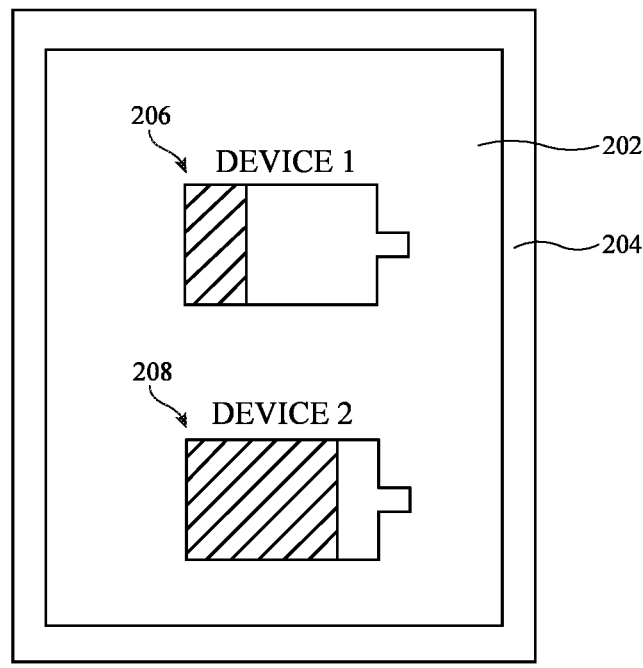
FIG. 11 is a top view of an illustrative charging system showing how a power receiving device may display battery charge status information for both the power receiving device and an adjacent power transmitting device in accordance with an embodiment.

FIG. 11 is a top view of an illustrative wireless charging system having a first device 202 (e.g., device 1) adjacent to a second device 204 (e.g., device 2). In the example of FIG. 11, device 1 is a cellular telephone (which may be a power transmitting and receiving device or a dedicated power receiving device) and device 2 is a battery case (which may be a power transmitting and receiving device or a dedicated power transmitting device). These examples are merely illustrative. In general, device 1 and device 2 may be any type of device.

The battery case 204 may include a rectangular recess with a rear wall surrounded by peripheral sidewalls and/or other suitable coupling structures (straps, clips, a sleeve, corner pockets, etc.) that allow the case to receive and couple to the device 202. The case may optionally include a front cover portion that is coupled to a rear cover portion with flexible structures. The front cover portion may be configured to optionally cover a front face of device 202.

During operation, device 204 may operate in a power transmitting mode and device 202 may operate in a power receiving mode. While in this configuration, device 204 may transmit its battery state of charge to device 202. Device 204 may transmit the battery state of charge to device 202 using a given wireless power coil and in-band communication (e.g., FSK modulation) while transmitting wireless power with the given wireless power coil.

Device 202 may display battery charge status information 206 (sometimes referred to as battery charge status, battery charge information, battery charge status indicator, etc.). The battery charge status information 206 may represent a state of charge of the battery of device 1 (device 202). Additionally, device 202 may display battery charge status information 208 (sometimes referred to as battery charge status, battery charge information, battery charge status indicator, etc.). The battery charge status information 208 may represent a state of charge of the battery of device 2 (device 204). Device 202 may display battery charge status information 208 based on the battery charge status information received from device 204 using in-band communication.

A battery-powered device in a power transmitting mode may transmit its state of charge in both a configuration phase (e.g., before a power transfer phase) and during a power transfer phase. As shown in connection with FIGS. 4 and 5, a device in a power transmitting mode may transmit a capabilities packet (e.g., packet 108) that includes information on the state of charge of the battery of the power transmitting device. This is an example of the state of charge information (for the power transmitter's battery) being transmitted from the power transmitter to the power receiving device before a power transfer phase (e.g., during a configuration phase).

Figure 12:
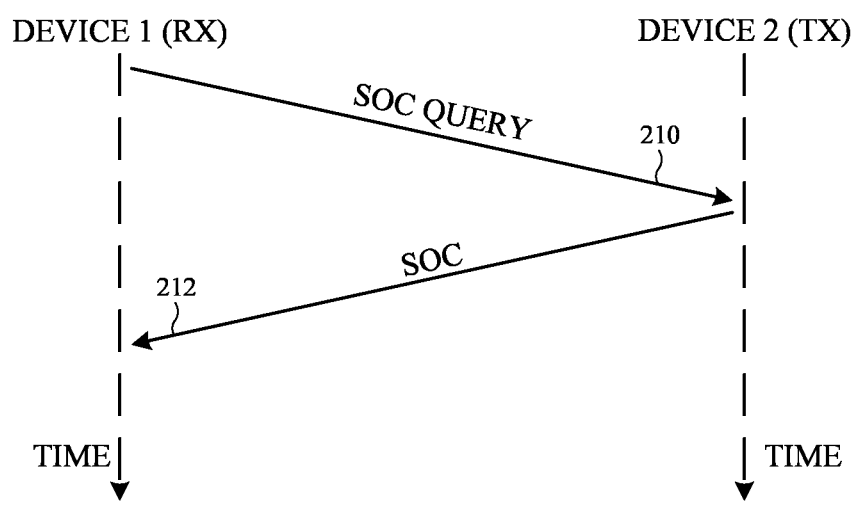
FIG. 12 is a timing diagram showing how a power receiving device may send a state of charge query to a power transmitting device and subsequently receive the state of charge of a battery in the power transmitting device in accordance with an embodiment.

In another example, the power transmitting device may transmit its state of charge during wireless power transfer (e.g., in response to a query from the power receiving device). FIG. 12 is a timing diagram showing an example of this type. As shown, device 1 may send a state of charge query 210 to device 2. The state of charge query may be sent using in-band communications (e.g., ASK modulation) with a coil while the coil receives wireless power from device 2.

In response to receiving the state of charge query, device 2 may send its state of charge 212 to device 1. The state of charge may be transmitted from device 2 to device 1 using in-band communications (e.g., FSK modulation) with a coil while the coil transmits wireless power to device 1. In one example, the state of charge may be transmitted from device 2 to device 1 as part of a transmitter capabilities packet (e.g., packet 108 shown in FIG. 6) that also includes information regarding the tether state of the power transmitting device and the swap capabilities of the power transmitting device. In another example, the state of charge may be transmitted from device 2 to device 1 in a dedicated packet that only includes the state of charge of the transmitting device battery (e.g., the information regarding the tether state and the swap capabilities may be omitted).

When device 1 receives the state of charge of the battery in device 2 from device 2, device 1 may take appropriate action. As one example, device 1 may update its user interface that displays battery charge status information 208 for device 2. As another example, device 1 may identify that the state of charge of the battery of device 2 is below a threshold (e.g., 40%, 30%, 20%, 10%, 5%, less than 30%, less than 50%, between 1% and 30%, etc.). In response to identifying that the state of charge of the device 2 battery is below a threshold, device 1 may instruct device 2 to deliver less power (e.g., reduce the power transfer level) or may instruct device 2 to cease delivering power entirely. In addition or instead, device 1 may output a user notification (e.g., using one or more of audio feedback, visual feedback, and haptic feedback) to notify the user that power transmission from device 2 to device 1 will soon cease. As yet another example, device 1 may request a role swap so that device 2 switches to a power receiving mode and device 1 switches to a power transmitting mode.

The example of FIG. 12 where device 2 transmits its battery's state of charge to device 1 in response to a query from device 1 is merely illustrative. Device 2 may also transmit its battery's state of charge in response to identifying that the state of charge is below a threshold (e.g., 40%, 30%, 20%, 10%, 5%, less than 30%, less than 50%, between 1% and 30%, etc.), in response to device 1 being tethered to a wired power source, in response to the state of charge of the battery of device 1 being greater than the state of charge of the battery of device 2, in response to device 1 having a battery with a large storage capacity (e.g., larger storage capacity than the device 2 battery), etc. Device 2 may also send a role swap or request to end power transfer in response to identifying that the state of charge is below a threshold (e.g., 40%, 30%, 20%, 10%, 5%, less than 30%, less than 50%, between 1% and 30%, etc.), in response to device 1 being tethered to a wired power source, in response to the state of charge of the battery of device 1 being greater than the state of charge of the battery of device 2, in response to device 1 having a battery with a large storage capacity (e.g., larger storage capacity than the device 2 battery), etc.

Figure 13:
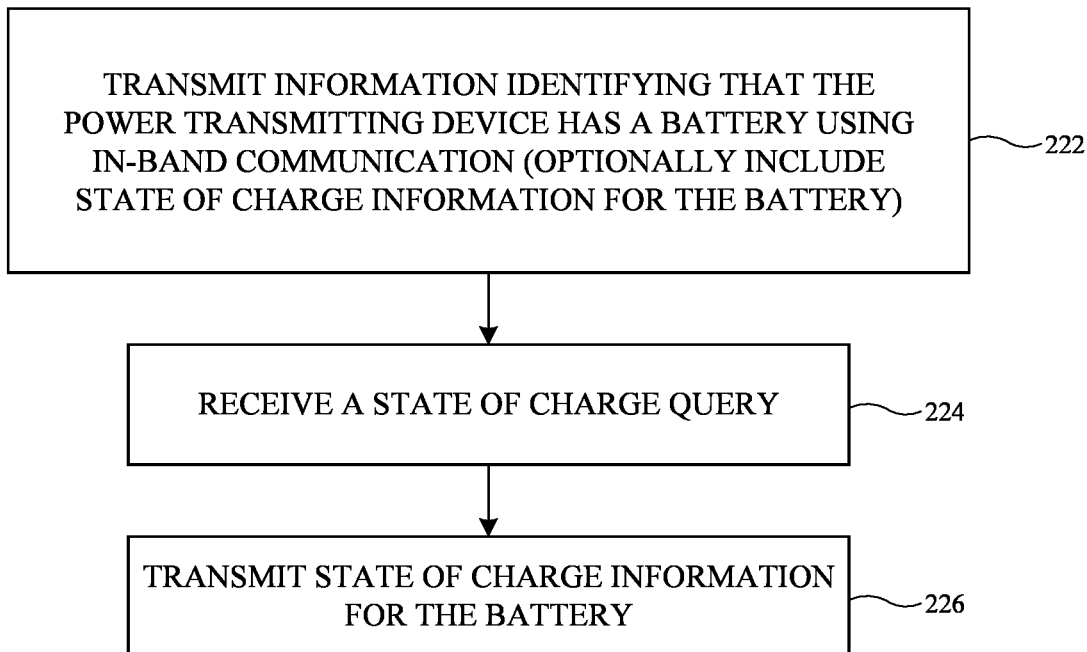
FIG. 13 is a flowchart of illustrative method steps for operating a power transmitting device that transmits its state of charge to a power receiving device during wireless charging in accordance with an embodiment.

FIG. 13 is a flowchart of illustrative method steps for operating a device in a power transmitting mode. Although the device in the power transmitting mode may also be operable in a power receiving mode, the device will sometimes be referred to as a power transmitting device. At step 222, the power transmitting device may transmit information identifying that the power transmitting device has a battery using in-band communication (e.g., FSK modulation). This information may be transmitted as part of a capabilities packet (as in FIG. 6) or as part of any other desired packet. Step 222 may occur during a configuration phase (e.g., before the power transfer phase). The power transmitting device may also optionally transmit additional wireless charging information during step 222. This optional information may include state of charge information for the battery of the power transmitting device (as one example).

The other information of packet 108 (e.g., tether information, swap capabilities, etc.) may also be transmitted from the power transmitting device to the power receiving device during step 222.

The power transmitting device may begin a power transfer phase during which a coil is used to transfer wireless power to the power receiving device. Then, at step 224, the power transmitting device may receive a state of charge query from the power receiving device. The power transmitting device may receive the state of charge query using in-band communication (e.g., ASK demodulation) with the coil while power is transferred from the coil to the power receiving device.

In response to receiving the state of charge query, the power transmitting device may transmit the state of charge for its battery to the power receiving device at step 226. The power transmitting device may transmit the state of charge for its battery to the power receiving device using in-band communication (e.g., FSK modulation).

It should be noted that in some cases a power transmitting device that does not include a battery may receive a state of charge query. In these cases, the power transmitting device may respond with a predetermined value indicating to the power receiving device that the power transmitting device does not include a battery.

In one possible wireless communication scheme, the power receiving device may determine whether or not to cease wireless charging operations with the power transmitting device. In other words, the power receiving device determines based on the power transmitting device battery's state of charge (e.g., when the state of charge is below a threshold) whether or not to throttle or cease wireless charging. In this example, the power receiving device may optionally send the power transmitting device an instruction to reduce a magnitude of power delivery or cease power transfer entirely.

In an alternate example, however, the power transmitting device may determine to throttle or cease wireless charging based on its own state of charge (e.g., when the state of charge is below some threshold). In this example, the power transmitting device may optionally send the power receiving device a message indicating that the state of charge is low and that the power transmitting device is planning to reduce a magnitude of power delivery or cease power transfer entirely. The power transmitting device may reduce the maximum available power and send this updated capability information to the power receiving device.

The power transmitting device may transmit its state of charge to the power receiving device in response to the state of charge being below a threshold (e.g., 40%, 30%, 20%, 10%, 5%, less than 30%, less than 50%, between 1% and 30%, between 1% and 10%, between 1% and 20%, etc.). Alternatively, the power transmitting device may transmit its state of charge to the power receiving device based on information indicating that the power receiving device is tethered to wired power, has a high state of charge (e.g., higher than the threshold or higher than the transmitter battery's state of charge), and/or has a large battery capacity (as these conditions may be sufficient to prompt a role swap).

After a battery-powered wireless power transmitting device transmits its state of charge (e.g., as in step 226), the wireless power transmitting device may later change modes (if the device is capable of also receiving wireless power). Numerous possible scenarios may lead to the battery-powered transmitting device switching to a wireless power receiving mode. These scenarios include the power receiving device being coupled to a wired power source, the battery-powered transmitting device being removed (decoupled) from the power receiving device and inductively coupled to a different coil of a different device that has a wired power source (e.g., a charging mat), the state of charge of the battery-powered transmitting device dropping below a threshold, etc.

Figure 14:
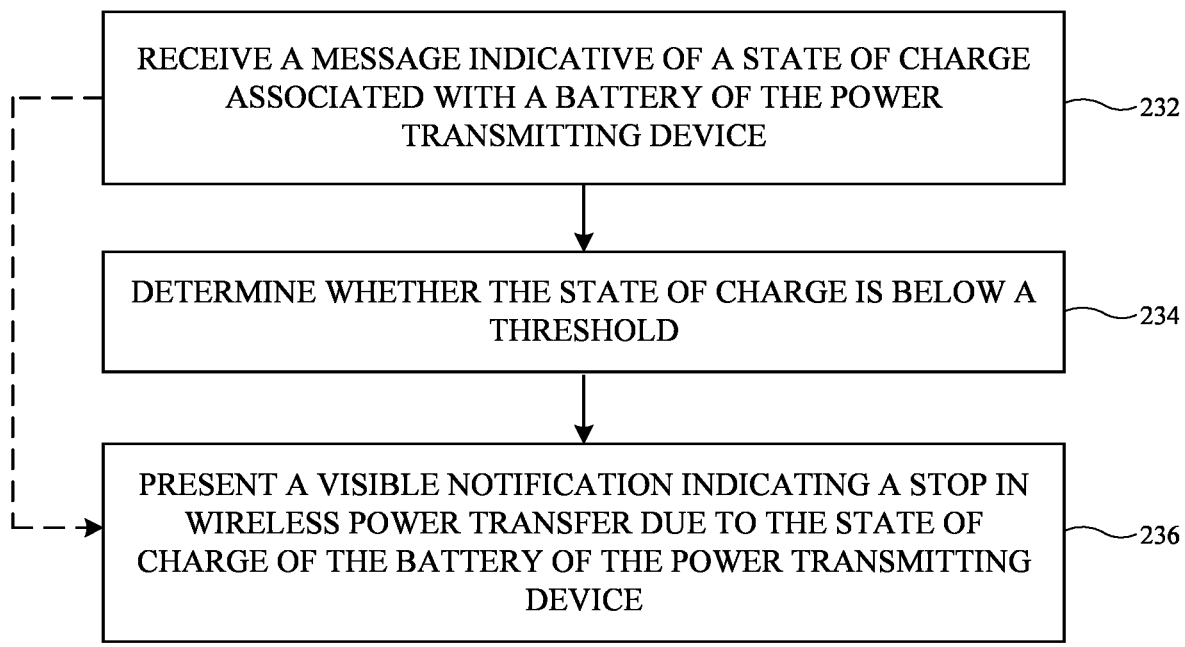
FIG. 14 is a flowchart of illustrative method steps for operating a power receiving device that receives a message indicative of the state of charge of a battery of a power transmitting device during wireless charging in accordance with an embodiment.

FIG. 14 is a flowchart of illustrative method steps for operating a device in a power receiving mode. Although the device in the power receiving mode may also be operable in a power transmitting mode, the device will sometimes be referred to as a power receiving device. As shown, at step 232 the power receiving device may receive a message indicative of the state of charge associated with a battery of the power transmitting device. At the same time, the power receiving device may be receiving wireless signals from the power transmitting device that are generated using the battery of the power transmitting device. The power receiving device may receive the message indicative of the state of charge using in-band communications (e.g., FSK demodulation).

The message indicative of the state of charge associated with the battery of the power transmitting device may include the magnitude of the state of charge of the battery. In this example, the power receiving device may determine whether the state of charge is below a threshold at step 234. The threshold may be any desired magnitude (e.g., 40%, 30%, 20%, 10%, 5%, less than 30%, less than 50%, between 1% and 30%, between 1% and 10%, between 1% and 20%, etc.). If the state of charge is above the threshold, the power receiving device may take no substantial action. At a subsequent time, the power receiving device may optionally send a query to the power transmitting device (e.g., using ASK modulation) to obtain an updated state of charge of the battery of the power transmitting device. If the state of charge is above the threshold, the power receiving device may optionally update its user interface (e.g., to present up-to-date battery charge status information 208 in FIG. 11).

If the state of charge is below the threshold, the method may proceed to step 236. As shown, at step 236 the power receiving device may present a user notification indicating an imminent or concurrent stop in wireless power transfer due to the state of charge of the battery of the power transmitting device. For example, the user notification may be a visible notification including text, may include audio feedback, and/or may include haptic feedback.

Also at step 236, the power receiving device may send an instruction to the power transmitting device to reduce or cease power transfer operations. Alternatively, the power receiving device may allow the power transmitting device to transmit all remaining power from the transmitting device battery.

In some cases, the message indicative of the state of charge received at step 232 may not explicitly include the magnitude of the state of charge. Instead, the message may be an 'end power transfer' packet indicating that power transfer will be imminently stopped. The end power transfer packet may include a reason for the end of power transfer. In this example, the reason for the end power transfer packet may be that the state of charge of the battery in the power transmitting device has dropped below a given threshold. In this case, the method may proceed directly to step 236 (as shown by the dashed arrow) to present the user notification of the imminent end of power transfer.

The example described herein of a battery case transmitting its state of charge to a cellular telephone is merely illustrative. In another example, two cellular telephones may be placed adjacent to each other, with one serving as a power transmitting device and one serving as a power receiving device. The devices may exchange state of charge information as well as other charging information. In this context, a battery-powered cellular telephone may transmit the state of charge of its battery to an additional cellular telephone using FSK modulation and a coil that is also simultaneously transmitting wireless power to the additional cellular telephone.

The foregoing is merely illustrative and various modifications can be made to the described embodiments. The foregoing embodiments may be implemented individually or in any combination.

What is claimed is:

1. Control circuitry for an electronic device having a wireless power coil, wherein the electronic device is operable in a wireless charging system with an additional electronic device and wherein the control circuitry is configured to:
   detect a presence of the additional electronic device using the wireless power coil;
   in accordance with detecting the presence of the additional electronic device, place the wireless power coil in a first mode in which the wireless power coil receives wireless power signals from the additional electronic device; and
   in accordance with receiving an instruction representing a mode change:
      transmit a mode change request packet to the additional electronic device, via the wireless power coil, using in-band communication; and
      change the wireless power coil from the first mode to a second mode in which the wireless power coil transmits wireless power signals to an additional wireless power coil of the additional electronic device.

2. The control circuitry of claim 1, wherein the control circuitry is further configured to, while the wireless power coil is in the first mode:
   receive first mode change capability information from the additional electronic device using in-band communication; and
   transmit second mode change capability information to the additional electronic device, via the wireless power coil, using in-band communication.

3. The control circuitry of claim 1, wherein the control circuitry is further configured to:
   cause a visible notification indicating that the electronic device is wirelessly charging the additional electronic device; and
   apply a power signal to the wireless power coil to create inductive coupling between the wireless power coil and the additional wireless power coil.

4. The control circuitry of claim 1, wherein the first mode is a default mode and wherein the wireless power coil is placed in the default mode each time the electronic device detects the presence of the additional electronic device and enters a configuration phase.

5. The control circuitry of claim 4, wherein changing the wireless power coil from the first mode to the second comprises changing the wireless power coil from the first mode to the second mode during the configuration phase.

6. The control circuitry of claim 4, wherein changing the wireless power coil from the first mode to the second comprises changing the wireless power coil from the first mode to the second mode during a power transfer phase that is subsequent to the configuration phase.

7. The control circuitry of claim 1, wherein the instruction representing the mode change is received from the additional electronic device.

8. The control circuitry of claim 1, wherein the electronic device comprises a battery having a state of charge and wherein the control circuitry is further configured to:
   generate the instruction representing the mode change in accordance with a comparison between the state of charge and a threshold.

9. The control circuitry of claim 1, wherein the control circuitry is further configured to generate the instruction representing the mode change in response to the electronic device being connected to a wired power source.

10. The control circuitry of claim 1, wherein the control circuitry is further configured to generate the instruction representing the mode change in response to receiving user input.

11. The control circuitry of claim 1, wherein the electronic device comprises an accelerometer and wherein detecting the presence of the additional electronic device comprises detecting the presence of the additional electronic device using the accelerometer.

12. The control circuitry of claim 1, wherein the electronic device comprises a sensor that is sensitive to electromagnetism and wherein detecting the presence of the additional electronic device comprises detecting the presence of the additional electronic device using the sensor.

13. The control circuitry of claim 1, wherein the control circuitry is further configured to:
   after transmitting the mode change request packet to the additional electronic device using in-band communication and before changing the wireless power circuitry from the first mode to the second mode, receive an acknowledgement accepting the mode change request, wherein changing the wireless power coil from the first mode to the second mode comprises changing the wireless power coil from the first mode to the second mode in accordance with receiving the acknowledgement accepting the mode change request.

14. The control circuitry of claim 13, wherein the mode change request packet comprises a reason for the request.

15. Control circuitry for an electronic device having a wireless power coil, wherein the electronic device is operable in a wireless charging system with an additional electronic device and wherein the control circuitry is configured to:
   detect a presence of the additional electronic device using the wireless power coil;
   in accordance with detecting the presence of the additional electronic device, place the wireless power coil in a first mode in which the wireless charging coil is configured to receive wireless power signals; and
   while the wireless power coil is in the first mode:
      monitor the wireless power coil for a power signal from the additional electronic device; and
      in accordance with not receiving the power signal from the additional electronic device within a threshold period of time, generate an instruction representing a mode change.

16. The control circuitry of claim 15, wherein the control circuitry is further configured to:
   in accordance with receiving the instruction representing the mode change, change the wireless power coil from the first mode to a second mode in which the coil is configured to transmit wireless power signals to an additional wireless power coil of the additional electronic device.

17. The control circuitry of claim 16, wherein the control circuitry is further configured to:
- after changing the wireless power coil from the first mode to the second mode, apply a power signal to the wireless power coil to create inductive coupling between the wireless power coil and the additional wireless power coil; and
- after applying the power signal to the wireless power coil to create inductive coupling, receive first mode change capability information from the additional electronic device using in-band communication.

18. The control circuitry of claim 17, wherein the control circuitry is further configured to:
- transmit second mode change capability information to the additional electronic device, via the wireless power coil, using in-band communication.

19. Control circuitry for an electronic device with a wireless power coil, wherein the electronic device is operable in a wireless charging system with an additional electronic device and wherein the control circuitry is configured to:
- in accordance with detecting the additional electronic device, place the wireless power coil in a wireless power receiving mode in which the coil receives wireless power signals from the additional electronic device; and
- in accordance with receiving an instruction representing a mode change:
  - transmit a mode change request packet to the additional electronic device, via the wireless power coil, using in-band communication; and
  - change the wireless power coil from the wireless power receiving mode to a wireless power transmitting mode in which the wireless power coil transmits wireless power signals.

20. The control circuitry of claim 19, wherein the control circuitry is further configured to generate the instruction representing the mode change in response to the electronic device being connected to a wired power source.

* * * * *